(12) United States Patent
Watanabe et al.

(10) Patent No.: US 10,167,370 B2
(45) Date of Patent: Jan. 1, 2019

(54) FILM, METHOD FOR PRODUCING SAME, TRANSPARENT CONDUCTIVE FILM, AND TOUCH PANEL

(71) Applicant: FUJIFILM Corporation, Tokyo (JP)

(72) Inventors: Naomi Watanabe, Fujinomiya (JP); Ryuta Takegami, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 15/145,325

(22) Filed: May 3, 2016

(65) Prior Publication Data

US 2016/0244580 A1 Aug. 25, 2016

Related U.S. Application Data

(63) Continuation of application No. PCT/JP2014/078450, filed on Oct. 27, 2014.

(30) Foreign Application Priority Data

Nov. 22, 2013 (JP) .................................. 2013-242306

(51) Int. Cl.
*C08J 7/04* (2006.01)
*B32B 7/12* (2006.01)
(Continued)

(52) U.S. Cl.
CPC ................. *C08J 7/042* (2013.01); *B32B 7/12* (2013.01); *B32B 27/08* (2013.01); *B32B 27/325* (2013.01);
(Continued)

(58) Field of Classification Search
None
See application file for complete search history.

(56) References Cited

U.S. PATENT DOCUMENTS

| 4,406,457 A * | 9/1983 | Gabrius ................. A63F 7/027 |
| | | 220/327 |
| 2005/0186379 A1* | 8/2005 | Rhee ....................... B32B 27/08 |
| | | 428/36.91 |

(Continued)

FOREIGN PATENT DOCUMENTS

| JP | 2009-222851 A | 10/2009 |
| JP | 2012-168330 A | 9/2012 |

(Continued)

OTHER PUBLICATIONS

Machine translation of JP 2012-168330A, retrieved Apr. 2018 (Year: 2018).*

(Continued)

*Primary Examiner* — Nicole M. Buie-Hatcher
(74) *Attorney, Agent, or Firm* — Sughrue Mion, PLLC

(57) ABSTRACT

A film includes a substrate including a cyclic olefin-based resin; and an easily adhesive layer adjacent to the substrate, in which a content of a fluorine-containing polymer in the easily adhesive layer is greater than 20 mass % with respect to a total mass of the easily adhesive layer. This film is used in a transparent conductive film, and this transparent conductive film is used in a touch panel. A method for producing a film includes laminating an easily adhesive layer by directly applying a coating liquid for forming an easily adhesive layer on a substrate including a cyclic olefin-based resin, in which a content of a fluorine-containing polymer in the coating liquid for forming the easily adhesive layer is greater than 20 mass % with respect to a total mass of the coating liquid for forming the easily adhesive layer.

19 Claims, 1 Drawing Sheet

(51) Int. Cl.
  *B32B 27/08* (2006.01)
  *B32B 27/32* (2006.01)
  *G06F 3/041* (2006.01)

(52) U.S. Cl.
  CPC .............. *C08J 7/04* (2013.01); *C08J 7/047* (2013.01); *G06F 3/041* (2013.01); *B32B 2255/10* (2013.01); *B32B 2255/26* (2013.01); *B32B 2307/202* (2013.01); *B32B 2307/412* (2013.01); *B32B 2457/208* (2013.01); *C08J 2323/24* (2013.01); *C08J 2345/00* (2013.01); *C08J 2427/12* (2013.01); *C08J 2489/00* (2013.01); *G06F 2203/04103* (2013.01)

(56) References Cited

U.S. PATENT DOCUMENTS

2012/0312677 A1* 12/2012 Kuriki ................. G06F 3/044
   200/600
2015/0336652 A1* 11/2015 Smith .................. B32B 27/327
   244/31

FOREIGN PATENT DOCUMENTS

| | | |
|---|---|---|
| JP | 2012-206343 A | 10/2012 |
| JP | 2012-234695 A | 11/2012 |
| JP | 2013-148766 A | 8/2013 |
| WO | 2005/115751 A1 | 12/2005 |
| WO | WO-2011093420 A1 * 8/2011 ............. G06F 3/044 |

OTHER PUBLICATIONS

International Preliminary Report on Patentability and Written Opinion, dated May 24, 2016, in corresponding International Application No. PCT/JP2014/078450.
Communication dated Jul. 19, 2016, from the Japanese Patent Office in counterpart application No. 2013-242306.
Communication dated Apr. 14, 2017, issued by the Korean Intellectual Property Office in corresponding Korean Application No. 10-2016-7012273.
Written Opinion of PCT/JP2014/078450 dated Dec. 16, 2014.
International Search Report of PCT/JP2014/078450 dated Dec. 16, 2014.
Communication dated Dec. 8, 2016, from the State Intellectual Property Office of the P.R.C., in counterpart Chinese application No. 201480058851.X.

* cited by examiner

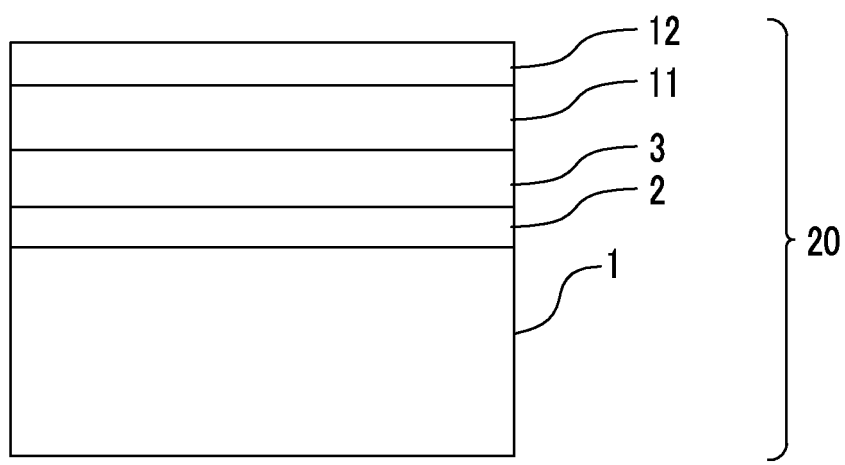

FILM, METHOD FOR PRODUCING SAME, TRANSPARENT CONDUCTIVE FILM, AND TOUCH PANEL

CROSS-REFERENCE TO RELATED APPLICATIONS

This application is a Continuation of PCT International Application No. PCT/JP2014/078450 filed on Oct. 27, 2014, which claims priority under 35 U.S.C § 119(a) to Japanese Patent Application No. 2013-242306 filed on Nov. 22, 2013. Each of the above application(s) is hereby expressly incorporated by reference, in its entirety, into the present application.

BACKGROUND OF THE INVENTION

1. Field of the Invention

The present invention relates to a film, a method for producing the same, a transparent conductive film, and a touch panel. Specifically, the present invention relates to a film containing a substrate and an easily adhesive layer with excellent wet adhesiveness, a method for producing the same, a transparent conductive film using the film, and a touch panel using the transparent conductive film.

2. Description of the Related Art

A cyclic olefin-based resin has excellent optical characteristics (transparency and low birefringence) or excellent dimensional stability, and thus is expected as an optical film. Particularly, it has been examined that the cyclic olefin-based resin is used as the substrate of transparent conductive films used in touch panels. In a case where the cyclic olefin-based resin is used for the substrate of transparent conductive films used in touch panels, it is required to secure the adhesiveness between a substrate including a cyclic olefin-based resin and a functional layer such as a transparent conductive layer, in order to prevent powder falling or film peeling at the time of handling.

In the related art, when a polyethylene terephthalate (hereinafter, referred to as "PET") film is used as a substrate, an undercoat layer including a gelatin is used as the undercoat layer between the transparent conductive layer and the substrate (see JP2012-234695A).

When the cyclic olefin-based resin film is used as the substrate, the undercoat layer including the urethane-based resin is well-known as an undercoat layer between the transparent conductive layer and the substrate (see JP2012-206343A). It is described that a fluorine resin as organic fine particles is added to an easily adhesive layer which is a urethane resin layer in "0128" to "0132" of JP2012-206343A.

Meanwhile, WO05/115751A discloses a release laminate film having a layer consisting of a modified polyolefin resin, and a layer consisting of an adhesive fluorine resin laminated on at least one side of the layer consisting of a modified polyolefin resin, in which surface characteristics of a fluorine resin are provided, interlayer release hardly occurs, workability and economic efficiency are excellent, and also the release laminate film easily follows the stepwise shape of a multilayer substrate at the time of performing press molding. However, WO05/115751A merely discloses a modified polyethylene as an example of the modified polyolefin resin but does not disclose an application to a cyclic olefin-based resin.

SUMMARY OF THE INVENTION

Under these circumstances, recently, in association with the increase in the use of a touch panel such as uses in vehicles, maintenance of interlayer adhesiveness between a substrate and a functional layer such as a transparent conductive layer under high humidity (for example, 85° C., relative humidity 85%, or the like) is required. In a case where a transparent conductive film is produced by exposing and developing a transparent conductive layer and providing the transparent conductive layer as a transparent conductive pattern, it is required to enhance interlayer adhesiveness between a substrate and a functional layer such as a transparent conductive layer in a state in which an entire film includes moisture in the same manner.

The present inventors immersed a conductive film provided with an undercoat layer including a gelatin disclosed in JP2012-234695A as an undercoat layer between a substrate and a transparent conductive layer by using a cyclic olefin-based resin as a substrate, in distilled water at 24° C. for 2 minutes and evaluated interlayer adhesiveness (hereinafter, also referred to as wet adhesiveness) in a state in which the film was not dried immediately after the immersion, that is, in a wet state, so as to find that interlayer adhesiveness in the wet state was not sufficient enough.

In the same manner, sufficient wet adhesiveness was not secured in a conductive film in which a cyclic olefin-based resin was used as a substrate and an undercoat layer including the urethane-based resin disclosed in JP2012-206343A was used as an undercoat layer between a substrate and a transparent conductive layer.

In WO05/115751A, interlayer adhesiveness at the time of winding after coextrusion by melt film forming is merely examined, but interlayer adhesiveness in a wet state was not reviewed.

The object to be achieved by the invention is to provide a film having excellent interlayer adhesiveness in a wet state in a case where a cyclic olefin-based resin is used as a substrate.

In order to solve the problems described above, the present inventors have conducted research and found that, compared with other binders, wet adhesiveness is enhanced in a case where a cyclic olefin-based resin is used as a substrate by providing an undercoat layer including a fluorine-containing polymer. As a result, the present inventors have found that a film having high interlayer adhesiveness between the substrate and the functional layer such as the transparent conductive layer in a wet state can be obtained by using a cyclic olefin-based resin as a substrate and providing an easily adhesive layer including a fluorine-containing polymer in a specific amount or greater adjacent to the substrate.

Specifically, the invention has the following configurations.

[1] A film comprising: a substrate including a cyclic olefin-based resin; and an easily adhesive layer that is laminated adjacent to the substrate,
in which a content of a fluorine-containing polymer in the easily adhesive layer is greater than 20 mass % with respect to a total mass of the easily adhesive layer.

[2] The film according to [1], in which a water content of the easily adhesive layer is preferably 0.3% to 2.5%.

[3] The film according to [1] or [2], in which a thickness of the easily adhesive layer is preferably 40 nm to 400 nm.

[4] The film according to any one of [1] to [3], in which the fluorine-containing polymer preferably includes a structural unit represented by Formula (a1) below and a structural unit derived from vinyl ether.

$$-[CFX^1-CX^2X^3]-$$ Formula (a1)

In Formula (a1), each of $X^1$ and $X^2$ independently represents a hydrogen atom, a chlorine atom, or a fluorine atom, and $X^3$ represents a chlorine atom, a fluorine atom, or —$CY^1Y^2Y^3$ (each of $Y^1$, $Y^2$, and $Y^3$ independently represents a hydrogen atom, a chlorine atom, or a fluorine atom).

[5] The film according to [4], in which the fluorine-containing polymer preferably includes 40 mol % to 90 mol % of a structural unit represented by Formula (a1) above, 3 mol % to 50 mol % of a structural unit represented by Formula (a2) below, 0.5 mol % to 30 mol % of a structural unit represented by Formula (a3) below, and 0.2 mol % to 7 mol % of a structural unit represented by Formula (a4) below (here, values of total mol % of the respective structural units represented by Formulae (a1), (a2), (a3), and (a4) are 80 to 100, and at least a portion of $R^4$ in the structural unit represented by Formula (a4) below is —$NZ^1Z^2Z^3$).

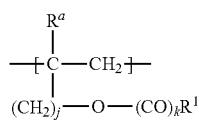

Formula (a2)

In Formula (a2), $R^a$ represents a hydrogen atom or a methyl group, $R^1$ represents an alkyl group having 1 to 12 carbon atoms or a monovalent alicyclic group having 4 to 10 carbon atoms, j represents an integer of 0 to 8, and k represents 0 or 1.

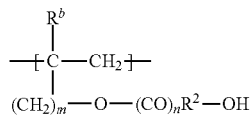

Formula (a3)

In Formula (a3), $R^b$ represents a hydrogen atom or a methyl group, $R^2$ represents an alkylene group having 1 to 10 carbon atoms or a divalent alicyclic group having 4 to 10 carbon atoms, m represents an integer of 0 to 8, and n represents 0 or 1.

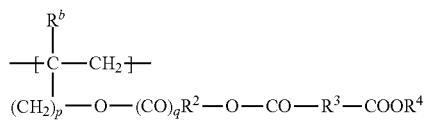

Formula (a4)

In Formula (a4), $R^b$ represents a hydrogen atom or a methyl group, $R^2$ represents an alkylene group having 1 to 10 carbon atoms or a divalent alicyclic group having 4 to 10 carbon atoms, $R^3$ represents an alkylene group having 2 to 10 carbon atoms or a divalent alicyclic group having 4 to 10 carbon atoms, $R^4$ represents a hydrogen atom or —$NZ^1Z^2Z^3$ (each of $Z^1$, $Z^2$, and $Z^3$ independently represents a hydrogen atom, an alkyl group having 1 to 4 carbon atoms, or a hydroxyalkyl group having 1 to 6 carbon atoms), p represents an integer of 0 to 8, and q represents 0 or 1.

[6] The film according to any one of [1] to [5], in which the easily adhesive layer is preferably formed from aqueous emulsion including the fluorine-containing polymer.

[7] The film according to [6], in which a minimum film formation temperature (MFT) of the aqueous emulsion is preferably 30° C. or lower.

[8] The film according to any one of [1] to [7], in which a layer A having a water contact angle of 70° or less is preferably laminated adjacent to the easily adhesive layer on a surface on an opposite side to a surface in contact with the substrate, among both surfaces of the easily adhesive layer.

[9] The film according to [8], in which the layer A preferably includes a gelatin.

[10] The film according to [8] or [9], in which a photosensitive material layer for forming a transparent conductive layer is preferably further laminated on a surface on an opposite side to a surface in contact with the easily adhesive layer, among both surfaces of the layer A.

[11] A method for producing a film, comprising: laminating an easily adhesive layer by directly applying a coating liquid for forming an easily adhesive layer on a substrate including a cyclic olefin-based resin, in which a content of a fluorine-containing polymer in the coating liquid for forming the easily adhesive layer is greater than 20 mass % with respect to a total mass of the coating liquid for forming the easily adhesive layer.

[12] The method for producing a film according to [11], further comprising: laminating a layer A by directly applying a coating liquid for forming the layer A on the easily adhesive layer, in which a water contact angle of the layer A is preferably 70° or less.

[13] The method for producing a film according to [12], in which the coating liquid for forming the layer A includes a gelatin.

[14] The method for producing a film according to [12] or [13], preferably further comprising: laminating a photosensitive material layer for forming a transparent conductive layer by directly applying an emulsion of the photosensitive material for forming the transparent conductive layer on the layer A.

[15] A transparent conductive film comprising: the film according to any one of [1] to [9]; and a transparent conductive layer.

[16] A transparent conductive film comprising: a transparent conductive layer formed by exposing and developing the photosensitive material layer for forming the transparent conductive layer of the film according to [10].

[17] A touch panel comprising: the transparent conductive film according to [15] or [16].

According to the invention, in a case where a cyclic olefin-based resin is used as a substrate, a film having excellent interlayer adhesiveness in a wet state can be provided.

BRIEF DESCRIPTION OF THE DRAWINGS

FIG. 1 is a diagram schematically illustrating a cross section of an example of a preferable aspect of a film according to the invention or a transparent conductive film according to the invention.

DESCRIPTION OF THE PREFERRED EMBODIMENTS

Hereinafter, the present invention is described in detail. The explanations of the components described below are based on the representative embodiments and specific examples, but the invention is not limited to the embodiments. In this specification, numerical value ranges presented by using the expression "to" mean a range including numerical values presented before and after the expression "to" as a lower limit and an upper limit.

[Film]

The film according to the invention has a substrate including a cyclic olefin-based resin and an easily adhesive layer adjacent to the substrate, and is characterized in that a content of the fluorine-containing polymer in the easily adhesive layer is greater than 20 mass % with respect to the total mass of the easily adhesive layer.

According to this configuration, the film according to the invention has excellent interlayer adhesiveness in a wet state in a case where a cyclic olefin-based resin is used as a substrate. Though not to be bound to any theory, an easily adhesive layer including a fluorine-containing polymer in a specific amount can provide interlayer easy adhesiveness to the substrate including a cyclic olefin-based resin in a highly wet state.

Hereinafter, preferable aspects of the film according to the invention are described.

<Configuration>

First, a preferable aspect of a configuration of the film according to the invention is described.

FIG. 1 is a diagram illustrating a cross-section illustrating an example of a preferable aspect of the film according to the invention. In FIG. 1, a film 20 according to the invention has a including a cyclic olefin-based resin and an easily adhesive layer 2 adjacent to the substrate 1. In FIG. 1, the substrate 1 is a single layer including a cyclic olefin-based resin.

The film 20 according to the invention is preferably an aspect in which a layer A (Reference numeral 3 in FIG. 1) in which a water contact angle is 70° or less is laminated adjacent to the easily adhesive layer 2, on a surface on an opposite side of a surface in contact with the substrate 1 among both surfaces of the easily adhesive layer 2.

The film 20 according to the invention is preferably an aspect in which a photosensitive material layer 11 for forming a transparent conductive layer (which may be a photosensitive material layer (an emulsion layer or a photosensitive layer) for forming a transparent conductive layer before exposure or may be a transparent conductive layer (a transparent electrode pattern) after exposure and development) is laminated on a surface on the opposite side of a surface in contact with the easily adhesive layer 2 among both surfaces of the layer A (Reference numeral 3 in FIG. 1).

The film 20 according to the invention is preferably an aspect in which a protective layer 12 is further laminated on a surface on an opposite side of a surface in contact with the layer A (Reference numeral 3 in FIG. 1) among both surfaces of the photosensitive material layer 11 for forming the transparent conductive layer.

The transparent conductive film 20 according to the invention is preferably a transparent conductive layer (transparent electrode pattern) after the photosensitive material layer 11 for forming the transparent conductive layer is exposed and developed.

<Substrate>

The substrate includes a cyclic olefin-based resin. The substrate may be a single layer which is a layer including a cyclic olefin-based resin.

Meanwhile, in a case where an aspect does not depart from the gist of the invention, the substrate may be a laminate of a layer including a cyclic olefin-based resin or another layer. In this case, a layer including a cyclic olefin-based resin of a substrate in the film according to the invention is disposed adjacent to an easily adhesive layer. For example, the substrate is a laminate film by coextrusion or the like, and a film having a thin cyclic olefin-based resin layer (having a thickness less than 50 mass % with respect to the entirety of the laminate film) only on the surface layer can be used as a substrate.

Among these, the substrate is preferably a single layer which is a layer including a cyclic olefin-based resin.

The cyclic olefin-based resin may be a homopolymer (also referred to as a cycloolefin polymer or a COP) only including a cyclic olefin structural unit or a copolymer (referred to as a cyclic olefin copolymer, a cycloolefin copolymer, or a COC) of a cyclic olefin structural unit and another structural unit. Among these, a cyclic olefin copolymer is preferable.

(Cyclic Olefin Copolymer Composition)

The substrate is preferably formed from a cyclic olefin copolymer composition described below.

The cyclic olefin copolymer composition preferably includes an ethylene unit and a norbornene unit. The norbornene unit preferably includes double sequence parts. Tacticity of the double sequence parts is preferably a meso type and a racemo type. A ratio of a meso-type double sequence part to a racemo-type double sequence part is preferably less than 2.0. The glass transition temperature (Tg) of the cyclic olefin copolymer composition is preferably 140° C. to 210° C.

A sequence part of a norbornene unit preferably exists in the cyclic olefin copolymer to a certain extent. It is known that tacticity in a double sequence part (hereinafter, referred to as NN diad) of the norbornene unit in a vinyl polymerization type have two types of stereoisomers: a meso type and a racemo type. As a ratio of a meso-type double sequence part to a racemo-type double sequence part, an existence ratio of a meso-type double sequence part to a racemo-type double sequence part is preferably less than 2.0 and more preferably 1.8 or less.

The existence ratio of the NN diad stereoisomer described herein can be obtained by $^{13}$C-NMR based on the report (see Macromol. Rapid Commun. 20, 279 (1999) described above) in which the tacticity of the cyclic olefin copolymer is analyzed. In $^{13}$C-NMR measured with a heavy orthodichlorobenzene solvent, a ratio of a meso-type double sequence part to a racemo-type double sequence part is calculated to be the same as a ratio of [peak area at 28.3 ppm in a $^{13}$C-NMR spectrum]/[peak area at 29.7 ppm in a $^{13}$C-NMR spectrum]. In the analysis by $^{13}$C-NMR, it is possible to calculate an existence ratio (molar fraction) of the NN diad with respect to the entire norbornene unit component amount, that is, how much the norbornene unit forms a chain structure. According to the invention, the existence ratio is preferably in the range of 0.1 to 0.6. The molar fraction described herein is calculated by [a peak area at 28.3 ppm in the $^{13}$C-NMR spectrum+a peak area at 29.7 ppm in the $^{13}$C-NMR spectrum]/[a peak area of one carbon atom in the entire norbornene component].

A glass transition temperature (Tg) of the cyclic olefin copolymer composition is preferably 140° C. to 210° C., more preferably 150° C. to 200° C., and even more preferably 160° C. to 190° C. In this manner, if the glass transition temperature (Tg) of the cyclic olefin copolymer composition is caused to be in this range, it is possible to prevent the generation of wrinkles in the film in a case where the film is formed from the cyclic olefin copolymer composition and the film is used in various display devices or the like.

If the ratio of the meso-type double sequence part to the racemo-type double sequence part in the double sequence part of the norbornene unit is caused to be less than 2.0, and the glass transition temperature (Tg) of the cyclic olefin copolymer composition is caused to be 140° C. to 210° C., it is possible to cause retardation in the in-plane direction (Re) and the retardation in the thickness direction (Rth) of the cyclic olefin copolymer film to be significantly small, and it is possible to prevent the generation of wrinkles on the film. Accordingly, even in a case where the film according to the invention using a cyclic olefin copolymer as a substrate is used as a transparent conductive film and incorporated with a touch panel, it is possible to prevent the change in color tone when the film is seen in an oblique direction.

<<Norbornene Unit>>

Preferable examples of the norbornene resin (norbornene unit) that becomes a raw material of the cyclic olefin copolymer composition include a saturated norbornene resin-A and a saturated norbornene resin-B described below. All of these saturated norbornene resins can be used for forming a film in a solution film forming method and a melt film forming method described below. However, it is more preferable that the saturated norbornene resin-A is used for forming a film in a melt film forming method and it is more preferable that the saturated norbornene resin-B is used for forming a film in a solution film forming method.

Examples of the saturated norbornene resin-A include (1) a resin obtained by performing polymer modification such as maleic acid addition or cyclopentadiene addition to a ring-opening (co)polymer of a norbornene-based monomer, if necessary, and thereafter hydrogenation, (2) a resin obtained by performing addition-type polymerization on the norbornene-based monomer, or (3) a resin obtained by performing addition-type copolymerization between a norbornene-based monomer and an olefin-based monomer such as ethylene or α-olefin. The polymerization and the hydrogenation can be performed in a usual manner.

Examples of the norbornene-based monomer include norbornene and alkyl and/or alkylidene substituted products thereof (for example, 5-methyl-2-norbornene, 5-dimethyl-2-norbornene, 5-ethyl-2-norborene, 5-butyl-2-norbornene, and 5-ethylidene-2-norbornene), and polar group substituted compounds of this halogen; dicyclopentadiene, 2,3-dihydrodicyclopentadiene, and the like; a polar group-substituted compound such as dimethanooctahydronaphthalene, alkyl and/or alkylidene substituted products thereof, and halogen (for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene); an adduct with cyclopentadiene, tetrahydroindene, and the like; and a trimer and a tetramer of cyclopentadiene (for example, 4,9:5,8-dimethano-3a,4,4a,5,8a,9,9a-octahydro-1H-benzoindene, and 4,11:5,10:6,9-trimethano-3a,4,4a,5,5a,6,9,9a,10,10a,11,11a-dodecahydro-1H-cyclopentaanthracene). These norbornene-based monomers may be used singly or in combination of two or more types.

Examples of the saturated norbornene resin-B include resins represented by General Formulae (1) to (4) below. Among these, resins represented by General Formula (1) below are particularly preferable.

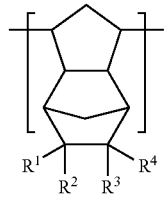

General Formula (1)

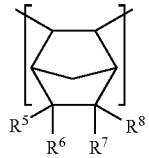

General Formula (2)

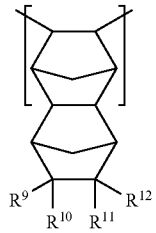

General Formula (3)

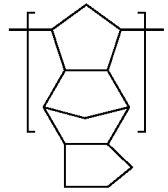

General Formula (4)

In General Formulae (1) to (4), each of $R^1$ to $R^{12}$ independently represents a hydrogen atom or a monovalent substituent (preferably an organic group), at least one of $R^1$ to $R^4$, at least one of $R^5$ to $R^8$, and at least one of $R^9$ to $R^{12}$ are preferably polar groups. In general, the weight average molecular weight of the saturated norbornene resin is preferably 5,000 to 1,000,000 and more preferably 8,000 to 200,000.

As the substituent, substituents described in paragraph "0036" in JP5009512B can be exemplified. As the polar group, substituents described in paragraph "0037" in JP5009512B can be exemplified.

Examples of the saturated norbornene resin that can be used in the invention include JP1985-168708A (JP-S60-168708A), JP1987-252406A (JP-S62-252406A), JP-1987-252407A (JP-S62-252407A), JP1990-133413A (JP-H2-133413A), JP1988-145324A (JP-S63-145324A), JP1988-264626A (JP-S63-264626A), JP-1989-240517A (JP-H1-240517A), and JP1982-8815B (JP-S57-8815B).

Among these resins, a hydrogenated polymer that can be obtained by adding hydrogen to a ring-opening polymer of a norbornene-based monomer is particularly preferable.

According to the invention, as the saturated norbornene resin, at least one type of tetracyclododecene derivative represented by General Formula (5) below singly or a hydrogenated polymer obtained by adding hydrogen to a polymer obtained by performing metathesis polymerization of a tetracyclododecene derivative and an unsaturated cyclic compound that is copolymerizable with this tetracyclododecene derivative.

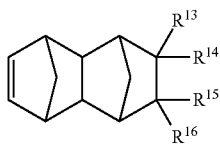

General Formula (5)

In General Formula (5), each of $R^{13}$ to $R^{16}$ independently represents a hydrogen atom or a monovalent substituent (preferably an organic group), and at least one of $R^{13}$ to $R^{16}$ is preferably a polar group. Specific examples and preferable ranges of the substituent and the polar group described herein are the same as the substituent and the polar group described with respect to General Formula (1) to (4).

If at least one of $R^{13}$ to $R^{16}$ is a polar group in the tetracyclododecene derivative represented by General Formula (5) above, a polarizing film having excellent adhesiveness with other materials and excellent heat resistance can be obtained. It is preferable that this polar group is a group represented by —$(CH_2)_n$COOR (here, R represents a hydrocarbon group having 1 to 20 carbon atoms and n represents an integer of 0 to 10), since a hydrogenated polymer (a substrate of the film) that is finally obtained has a high glass transition temperature. Particularly, one of the polar groups represented by —$(CH_2)_n$COOR is preferably contained per one molecule of the tetracyclododecene derivative of General Formula (5) in that water absorption decreases. In the polar group, as the number of carbon atoms included in the hydrocarbon group represented by R increases, it is preferable in that hygroscopic properties of the obtained hydrogenated polymer is decreased. However, in view of balance with the glass transition temperature of the obtained hydrogenated polymer, the hydrocarbon group is preferably a chain alkyl group having 1 to 4 carbon atoms or a (poly) cyclic alkyl group having 5 or greater carbon atoms, and particularly preferably a methyl group, an ethyl group, and a cyclohexyl group.

A tetracyclododecene derivative of General Formula (5) in which, as a substituent, a hydrocarbon group having 1 to 10 carbon atoms is bonded to a carbon atom to which a polar group represented by —$(CH_2)_n$COOR is bonded, is preferable, since the obtained hydrogenated polymer becomes a compound having low-hygroscopic properties. Particularly, the tetracyclododecene derivatives of the General Formula (5) of which the substituent is a methyl group or an ethyl group is preferable in that the Synthesis thereof is easy. Specifically, 8-methyl-8-methoxycarbonyltetracyclo[4,4,0, $1^{2.5},1^{7.10}$]dodeca-3-ene is preferable. Mixtures of these tetracyclododecene derivatives and unsaturated cyclic compounds that are copolymerizable with these tetracyclododecene derivatives can be subjected to metathesis polymerization or hydrogen addition in methods described from line 12 of the right upper section of page 4 to line 6 of the right lower section of page 6 of JP1992-77520A (JP-H4-77520A).

In these norbornene-based resins, the intrinsic viscosity ($\eta_{inh}$) measured at 30° C. in chloroform is preferably 0.1 dl/g to 1.5 dl/g and is even more preferably 0.4 dl/g to 1.2 dl/g. With respect to a hydrogenation rate of the hydrogenated polymer, a value measured at 60 MHz with $^1$H-NMR is preferably 50% or greater, more preferably 90% or greater, and even more preferably 98% or greater. As the hydrogenation rate is higher, the obtained saturated norbornane film is excellent in stability to heat or light. The gel content included in the hydrogenated polymer is preferably 5 mass % or less and even more preferably 1 mass % or less.

(Other Ring-Opening Polymerizable Cycloolefins)

According to the invention, in a range of not deteriorating the object of the invention, other ring-opening polymerizable cycloolefins can be used together. Specific examples of this cycloolefin include a compound having one reactive double bond such as cyclopentene, cyclooctene, 5,6-dihydrodicyclopentadiene. In the cyclic olefin copolymer composition, the content of these ring-opening polymerizable cycloolefins is preferably 0 mol % to 50 mol %, more preferably 0.1 mol % to 30 mol %, and particularly preferably 0.3 mol % to 10 mol % with respect to the norbornene-based monomer.

<<Ethylene Unit>>

The ethylene unit used in the invention is a repeating unit represented by —$CH_2CH_2$—. It is possible to obtain a cyclic olefin copolymer by performing vinyl polymerization on the ethylene unit with the norbornene unit described above.

According to the invention, the copolymerization ratio of the norbornene unit and the ethylene unit is preferably 80:20 to 60:40, more preferably 80:20 to 65:35, and still more preferably 80:20 to 70:30. Accordingly, it is possible to cause the ratio of the meso-type double sequence part to the racemo-type double sequence part in the norbornene unit and the glass transition temperature of the norbornene unit to be in the desired ranges.

The cyclic olefin copolymer may include a small amount of a repeating unit consisting of other copolymerizable vinyl monomers in a range of not deteriorating the object of the invention, in addition to the ethylene unit and the norbornene unit. Specific examples of the other vinyl monomers include α-olefin having 3 to 18 carbon atoms such as propylene, 1-butene, 1-hexene, 4-methyl-1-pentene, 1-octene, 1-decene, 1-dodecene, 1-tetradecene, 1-hexadecene, and 1-octadecene, and cycloolefin such as cyclobutene, cyclopentene, cyclohexene, 3-methylcyclohexene, and cyclooctane. These vinyl monomers may be used singly or in combination of two or more types thereof. The content of the repeating unit thereof is preferably 10 mol % or less or more preferably 5 mol % or less with respect to the entire cyclic olefin copolymer composition.

<<Other Additives>>

In a range of not deteriorating the object of the invention, other additives may be added to the substrate. Examples of the additives include an antioxidant, an ultraviolet absorbing agent, a lubricant, and an antistatic agent. Specifically, in a case where the substrate is provided on surfaces of various devices, it is preferable to include an ultraviolet absorbing agent. As the ultraviolet absorbing agent, a benzophenone-based ultraviolet absorbing agent, a benzotriazole-based ultraviolet absorbing agent, an acrylonitrile-based ultraviolet absorbing agent, and the like can be used.

(Cyclic Olefin Copolymer Film)

The substrate preferably includes 50 mass % or greater of the cyclic olefin-based resin, more preferably includes 90 mass % or greater of the cyclic olefin-based resin, and particularly preferably includes only the cyclic olefin-based resin, as the polymer component. The substrate is a single layer, and preferably includes 50 mass % or greater of the cyclic olefin-based resin, more preferably includes 90 mass % or greater of the cyclic olefin-based resin, and particularly preferably includes only the cyclic olefin-based resin, as the polymer component.

Meanwhile, in a case where the substrate is a laminate of a layer including the cyclic olefin-based resin and another layer, the layer including the cyclic olefin-based resin preferably includes 50 mass % or greater of the cyclic olefin-based resin, more preferably 90 mass % or greater of the cyclic olefin-based resin, and particularly preferably only the cyclic olefin-based resin, as the polymer component.

The substrate used in the film according to the invention is a single layer and preferably a cyclic olefin copolymer film formed from the cyclic olefin copolymer composition described above. The cyclic olefin copolymer film can be obtained by causing the cyclic olefin copolymer composition to form a film.

The substrate preferably is stretched in at least the uniaxial direction of a vertical direction (hereinafter, referred to as "MD direction" or "vertical") or a horizontal direction (hereinafter, referred to as "TD direction" or "horizontal") and more preferably is stretched in a biaxial direction in the vertical direction (MD direction) and the horizontal direction (TD direction). In a case of biaxial stretching in the vertical direction and the horizontal direction, the stretching may be sequentially performed in a manner vertical to horizontal or horizontal to vertical. Otherwise, the stretching may be performed in two directions simultaneously. For example, the stretching may be performed in multiple states in a manner of vertical, vertical, and horizontal, in a manner of vertical, horizontal, and vertical, or in a manner of vertical, horizontal, and horizontal.

In general, in a case where the film is formed by stretching the cyclic olefin copolymer composition, the film thickness can be caused to be thin, but the retardation in the in-plane direction or the thickness direction tends to increase. If the ratio of the meso-type double sequence part to the racemo-type double sequence part in the double sequence part of the norbornene unit is caused to be less than 2.0, it is preferable to cause the retardation in the in-plane direction and the thickness direction to be small while the film thickness is caused to be thin.

The film thickness of the substrate is preferably 10 μm to 100 μm, more preferably 10 μm to 60 μm, and particularly preferably 10 μm to 50 μm. In this manner, the substrate can be caused to be a thin film. Here, the film thickness of the substrate means the average film thickness of the film.

(Method for Producing Substrate)

The method for producing the substrate is not particularly limited. A well-known cyclic olefin-based resin film can be used as a substrate, or the substrate may be produced by using the cyclic olefin copolymer composition.

Examples of the well-known film that can be used as the substrate include ARTON D4540 (manufactured by JSR Corporation) which is a commercially available cyclic olefin-based resin film.

The cyclic olefin copolymer film using the cyclic olefin copolymer composition can be formed in all methods of the solution film forming method and the melt film forming method.

For the purpose of strongly adhering respective layers to the substrate, it is preferable that a surface activation treatment such as a chemical treatment, a mechanical treatment, a corona discharge treatment, a flame treatment, an ultraviolet treatment, a high frequency treatment, a glow discharge treatment, an active plasma treatment, a laser treatment, a mixed acid treatment, an ozone acid treatment is performed in advance.

For example, in a case where the layer A is manufactured by applying a coating liquid for forming the layer A or the like, examples of the method of securing adhesiveness between the substrate and the layer A include a method of once performing the surface activation treatment and also applying the coating liquid for forming the layer A on the easily adhesive layer.

<Easily Adhesive Layer>

The film according to the invention has an easily adhesive layer adjacent to the substrate, and the content of the fluorine-containing polymer in the easily adhesive layer is greater than 20 mass % with respect to the entire easily adhesive layer.

The content of the fluorine-containing polymer is preferably greater than 50 mass %, more preferably greater than 70 mass %, particularly preferably greater than 80 mass %, and particularly preferably greater than 90 mass % with respect to the entire easily adhesive layer.

(Fluorine-Containing Polymer)

In the film according to the invention, the fluorine-containing polymer preferably includes a structural unit represented by Formula (a1) below and a structural unit derived from vinyl ether.

$$-[CFX^1-CX^2X^3]-\qquad\text{Formula (a1)}$$

In Formula (a1), each of $X^1$ and $X^2$ independently represents a hydrogen atom, a chlorine atom, or a fluorine atom, $X^3$ represents a chlorine atom, a fluorine atom, or $-CY^1Y^2Y^3$ (each of $Y^1$, $Y^2$, and $Y^3$ independently represents a hydrogen atom, a chlorine atom, or a fluorine atom).

In the film according to the invention, the fluorine-containing polymer is preferably the fluorine-containing copolymer (A) including a structural unit represented by Formula (a1) above, a structural unit represented by Formula (a2) below, a structural unit represented by Formula (a3) below, and a structural unit represented by Formula (a4) below.

In the film according to the invention, the fluorine-containing polymer is more preferably the fluorine-containing copolymer (A) including 40 mol % to 90 mol % of the structural unit represented by Formula (a1) above, 3 mol % to 50 mol % of the structural unit represented by Formula (a2) below, 0.5 mol % to 30 mol % of the structural unit represented by Formula (a3) below, and 0.2 mol % to 7 mol % of the structural unit represented by Formula (a4) below (here, the total mol % values of respective structural units represented by Formulae (a1), (a2), (a3), and (a4) are 80 to 100, and at least a portion of $R^4$ in the structural unit represented by Formula (a4) below is $-NZ^1Z^2Z^3$).

Formula (a2)

$R^a$ represents a hydrogen atom or a methyl group in Formula (a2), $R^1$ represents an alkyl group having 1 to 12 carbon atoms or a monovalent alicyclic group having 4 to 10 carbon atoms, j represents an integer of 0 to 8, k represents 0 or 1.]

Formula (a3)

$$\begin{array}{c} R^b \\ | \\ -\!\!+\!\!C-CH_2\!\!+\!\!- \\ | \\ (CH_2)_m-O-(CO)_nR^2-OH \end{array}$$

In Formula (a3), $R^b$ represents a hydrogen atom or a methyl group, $R^2$ represents an alkylene group having 1 to 10 carbon atoms or a divalent alicyclic group having 4 to 10 carbon atoms, m represents an integer of 0 to 8, and n represents 0 or 1.]

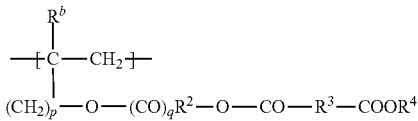

Formula (a4)

In Formula (a4), $R^b$ represents a hydrogen atom or a methyl group, $R^2$ represents an alkylene group having 1 to 10 carbon atoms or a divalent alicyclic group having 4 to 10 carbon atoms, $R^3$ represents an alkylene group having 2 to 10 carbon atoms or a divalent alicyclic group having 4 to 10 carbon atoms, $R^4$ represents a hydrogen atom or $-NZ^1Z^2Z^3$ (each of $Z^1$, $Z^2$, and $Z^3$ independently represents a hydrogen atom, an alkyl group having 1 to 4 carbon atoms or a hydroxyalkyl group having 1 to 6 carbon atoms), p represents an integer of 0 to 8, and q represents 0 or 1.]

The fluorine-containing copolymer (A) is formed with a structural unit represented by Formula (a1), a structural unit represented by Formula (a2), a structural unit represented by Formula (a3), and a structural unit represented by Formula (a4). The total mol % values of the respective structural units represented by Formulae (a1), (a2), (a3), and (a4) are 80 to 100 and preferably 95 to 100.

In this specification, the structural unit represented by Formula (a1) is also referred to as a "structural unit (a1)". The compounds represented by other formulae are also referred to in the same manner.

The structural unit (a1) is a structural unit based on the fluoroolefin-based compound represented by Formula (a1) below.

$$-CFX^1-CX^2X^3-$$ Formula (a1)

Here, in Formula (a1), each of $X^1$ and $X^2$ independently represents a hydrogen atom, a chlorine atom, or a fluorine atom, $X^3$ represents a chlorine atom, a fluorine atom, or $-CY^1Y^2Y^3$ (each of $Y^1$, $Y^2$, and $Y^3$ independently represents a hydrogen atom, a chlorine atom, or a fluorine atom).

Examples of the structural unit (a1) include structural units based on fluoroolefin-based compounds below.

Fluoroethylene such as $CF_2=CF_2$, $CClF=CF_2$, $CHCl=CF_2$, $CCl_2=CF_2$, $CClF=CClF$, $CHF=CCl_2$, $CH_2=CClF$, and $CCl_2=CClF$.

Fluoropropenes such as $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CH_3CCl=CHCl$, $CHF_2CCl=CCl_2$, $CF_2ClCH=CCl_2$, $CF_2ClCCl=CHCl$, $CCl_3CF=CHCl$, and $CH_2BrCF=CCl_2$.

A fluoroolefin-based compound having 4 or greater carbon atoms such as $CF_3CCl=CFCF_3$, $CF_2=CFCF_2CClF_2$, and $CF_3CF_2CF=CCl_2$.

Among these, $CF_2=CF_2$ and $CClF=CF_2$ have excellent weather resistance of the coating film and are preferable.

The content ratio of the structural unit (a1) in the fluorine-containing copolymer (A) is preferably 40 mol % to 90 mol % and more preferably 45 mol % to 70 mol %.

If the content ratio of the structural unit (a1) is in the range described above, sufficient weather resistance can be obtained, a film of which a glass transition temperature of the polymer is not too high, and which is amorphous and favorable can be obtained.

A structural unit (a2) is a structural unit based on alkyl vinyl ether, alkyl vinyl ester, alkyl allyl ether, or alkyl allyl ester represented by Formula (a2) below.

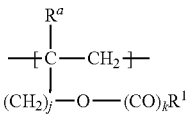

Formula (a2)

Here, in Formula (a2), $R^a$ represents a hydrogen atom or a methyl group, $R^1$ represents an alkyl group having 1 to 12 carbon atoms or a monovalent alicyclic group having 4 to 10 carbon atoms, j represents an integer of 0 to 8, and k represents 0 or 1.

As the structural unit represented by Formula (a2), alkyl vinyl ether or alkyl vinyl ester in which j=0 and k=0 or 1 is preferable.

Examples of the structural unit (a2) include a structural unit based on ethyl vinyl ether, n-butyl vinyl ether, cyclohexyl vinyl ether, vinyl acetate, vinyl valerate, or vinyl pivalate. Among these, a structural unit according to desired coating film characteristics (hardness, glossy, pigment dispersion properties, and the like) is appropriately selected.

Among these, a structural unit based on ethyl vinyl ether, cyclohexyl vinyl ether, and the like is preferable, in that alternative copolymerizability with the structural unit (a1) is satisfactory and the glass transition temperature of the resin is easily adjusted.

The ratio of the structural unit (a2) is preferably 3 mol % to 50 mol % and more preferably 20 mol % to 45 mol % with respect to the entire structural unit of the fluorine-containing copolymer (A). According to the invention, two or more types of the structural unit (a2) may be used.

A structural unit (a3) is a structural unit based on hydroxy group-containing vinyl ether, hydroxy group-containing vinyl ester, hydroxy group-containing allyl ether, hydroxy group-containing allyl ester, and the like which are represented by Formula (a3) below.

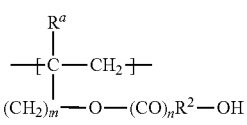

Formula (a3)

Here, in Formula (a3), $R^b$ represents a hydrogen atom or a methyl group, $R^2$ represents an alkylene group having 1 to 10 carbon atoms or a divalent alicyclic group having 4 to 10 carbon atoms, m represents an integer of 0 to 8, and n represents 0 or 1.

Examples of the structural unit (a3) include a structural unit based on 2-hydroxyalkyl vinyl ether, 4-hydroxybutyl vinyl ether, 1-hydroxymethyl-4-vinyloxymethylcyclohexane, and 4-hydroxybutyl vinyl ester. Among these, in view of polymerizability, crosslinkability, or the like, a structural unit based on hydroxyalkyl vinyl ether is preferable.

The content ratio of the structural unit (a3) in the fluorine-containing copolymer (A) is preferably 0.5 mol % to 30 mol % and more preferably 4 mol % to 25 mol %.

If the content ratio of the structural unit (a3) is too small, when the fluorine-containing copolymer (A) is crosslinked, crosslinking density decreases. If the content ratio of the structural unit (a3) is too great, it is concerned that water resistance decreases when a coating film is formed.

A structural unit (a4) is a structural unit represented by Formula (a4) below.

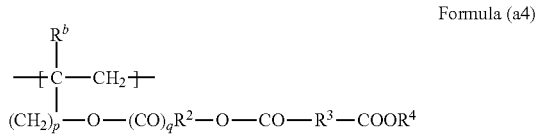

Formula (a4)

Here, in Formula (a4), $R^b$ represents a hydrogen atom or a methyl group, $R^2$ represents an alkylene group having 1 to 10 carbon atoms or a divalent alicyclic group having 4 to 10 carbon atoms, $R^3$ represents an alkylene group having 2 to 10 carbon atoms or a divalent alicyclic group having 4 to 10 carbon atoms, $R^4$ represents a hydrogen atom or $-NZ^1Z^2Z^3$ (each of $Z^1$, $Z^2$, and $Z^3$ independently represents a hydrogen atom, an alkyl group having 1 to 4 carbon atoms or a hydroxyalkyl group having 1 to 6 carbon atoms), p represents an integer of 0 to 8, and q represents 0 or 1.

Among all fluorine-containing polymers included in the easily adhesive layer, in the structural unit (a4), a ratio of the fluorine-containing polymer (preferably, the fluorine-containing copolymer (A)) in which $R^4$ represents $-NZ^1Z^2Z^3$ is preferably 30 mol % to 100 mol % and more preferably 50 mol % to 100 mol %.

The content ratio of the structural unit (a4) in the fluorine-containing copolymer (A) is preferably 0.2 mol % to 7 mol % and more preferably 0.4 mol % to 6 mol %.

If the ratio of the structural unit (a4) is in the range described above, the solubility to water and dispersibility are excellent and thus stability in water is excellent.

The fluorine-containing copolymer (A) according to the invention may include structural units other than the structural unit (a1), the structural unit (a2), the structural unit (a3), and the structural unit (a4) (hereinafter, referred to as other structural units) in a content ratio of 20 mol % or less.

Examples of the other structural units include structural units based on an ethylenic monomer.

The particularly preferable configuration of the fluorine-containing copolymer (A) is 45 mol % to 70 mol % in the structural unit (a1), 14 mol % to 45.6 mol % in the structural unit (a2), 8 mol % to 25 mol % in the structural unit (a3), and 1 mol % to 6 mol % in the structural unit (a4), and has a configuration that does not contain the other structural units.

(Other Resin Component)

In the easily adhesive layer, other resins other than the fluorine-containing copolymer (A) may be included together with the fluorine-containing copolymer (A). Examples of the other synthetic resin include fluorine-based, phenol-based, alkyd-based, melamine-based, urea-based, vinyl-based, epoxy-based, polyester-based, polyurethane-based, and acrylic synthetic resins or the like. Examples of the other resins other than the synthetic resin include a gelatin. If the gelatin is added, the water content of the easily adhesive layer can be enhanced.

Examples of the fluorine-based synthetic resin include a fluorine-containing copolymer having a configuration unit based on fluoroolefin disclosed in JP2955336B and a configuration unit based on a macro monomer having a hydrophilic portion, as essential configuration components. Here, the hydrophilic portion means a portion having a hydrophilic group, a portion having a hydrophilic bond, or a portion consisting of combination thereof. The macro monomer refers to an oligomer or a polymer which has a radical polymerizable unsaturated group at one terminal and which has a low molecular weight. A case where this fluorine-containing copolymer is contained is preferable in that mechanical stability and chemical stability of the water paint composition are improved.

(Others)

In addition to the fluorine-containing polymer or the other synthetic resin component, the easily adhesive layer may include a crosslinking agent, a film formation assistant, a matting agent, a lubricant, a surfactant, a defoaming agent, a foam suppressing agent, a dye, a fluorescent brightening agent, a preservative, a water-resistant agent, an antistatic agent, and a catalyst of a crosslinking agent, if necessary. Examples of the catalyst of the crosslinking agent include a catalyst for ELASTRON (manufactured by Dai-ichi Kogyo Seiyaku Co., Ltd.: Product Name: CAT64).

<<Crosslinking Agent>>

The easily adhesive layer preferably includes a crosslinking agent. The easily adhesive layer is used for enhancing wet adhesiveness between the layer A and the substrate. The crosslinking agent may be an agent that occurs crosslinking reaction when the easily adhesive layer is formed, and may not remain after the easily adhesive layer is formed. That is, in the obtained film according to the invention, the crosslinking agent may be incorporated with a portion of the crosslinking structure in which other molecules are crosslinked and have already completed the reaction or the action as a crosslinking agent in advance. Depending on the crosslinking agent, crosslinking points between the molecules or in the molecule in the easily adhesive layer increase, and accordingly the adhering force of the easily adhesive layer to the layer A and the substrate further enhanced.

As the crosslinking agent that is included in the easily adhesive layer, an oxazoline-based compound, a carbodiimide-based compound, an epoxy-based compound, an isocyanate-based compound, and a melamine-based compound ($C_3N_6H_6$) are preferable. Among these, plural types thereof may be included in the easily adhesive layer. As the crosslinking agent, an oxazoline-based compound and a carbodiimide-based compound are particularly preferable.

The oxazoline-based compound is a compound having an oxazoline group represented by Formula (1) below.

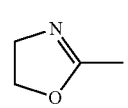

Formula (1)

Examples of the oxazoline-based compound include a polymer having an oxazoline group, for example, a polymer obtained by copolymerizing a polymerizable unsaturated monomer having an oxazoline group with other polymerizable unsaturated monomers in a well-known method (for example, solution polymerization and emulsion polymerization), if necessary. Examples of the polymerizable unsaturated monomer having the oxazoline group include a monomer including 2-vinyl-2-oxazoline, 2-vinyl-4-methyl-2- oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, or the like, as a monomer unit. Two or more types thereof may be used together. For example, the oxazoline-based compound can be obtained as commercially available products such as EPOCROS K-2020E, EPOCROS K-2010E, EPOCROS K-2030E, EPOCROS WS-300, EPOCROS WS-500, and EPOCROS WS-700 (manufactured by Nippon Shokubai Co., Ltd.).

The carbodiimide-based compound is a compound having a functional group represented by —N=C=N—. Polycarbodiimide is generally synthesized by condensation reaction of organic diisocyanate, but the organic group of organic diisocyanate used in this Synthesis is not particularly limited, and any one of an aromatic group or an aliphatic group, or a mixture thereof can be used. However, in view of reactivity, an aliphatic group is particularly preferable. As the raw material of the Synthesis, organic isocyanate, organic diisocyanate, organic triisocyanate, and the like are used. As an example of organic isocyanate, aromatic isocyanate, aliphatic isocyanate, and a mixture of these can be used. Specifically, 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, 1,3-phenylene diisocyanate, and the like are used. As organic monoisocyanate, isophorone isocyanate, phenyl isocyanate, cyclohexyl isocyanate, butyl isocyanate, naphthyl isocyanate, and the like can be used. Examples of the carbodiimide-based compound can be obtained as a commercially available product of CARBODILITE V-02-L2 (manufactured by Nisshinbo Holdings Inc.).

In the coating liquid for forming the easily adhesive layer when the easily adhesive layer is formed from aqueous emulsion including the fluorine-containing polymer, the crosslinking agent is preferably added by 5 mass % to 70 mass %, is more preferably added by 10 mass % to 60 mass %, and is particularly preferably added by 15 mass % to 50 mass % with respect to the total of the fluorine-containing polymer and the other synthetic resin component.

<<Film Formation Assistant>>

An aqueous solvent is used as the solvent in the coating liquid for forming the easily adhesive layer when the easily adhesive layer is formed from the aqueous emulsion including the fluorine-containing polymer. However, as the film formation assistant, the water miscible organic solvent can be used together. Examples of the water miscible organic solvent include an alcohol-based solvent such as methyl alcohol, ethyl alcohol, and propyl alcohol, a cellosolve-based solvent such as methyl cellosolve, ethyl cellosolve, and butyl cellosolve, ethyl acetate, and dimethylformamide.

Examples of the film formation assistant that can be added to the coating liquid for forming the easily adhesive layer when the easily adhesive layer can be formed from the aqueous emulsion including the fluorine-containing polymer include ethyl acetoacetate, tetramethylsulfone, γ-butyrolactone, ethylene glycol monoethyl ether acetate, ethylene glycol monobutyl ether, diacetone alcohol, diglyme, dimethyl sulfoxide, diethylene glycol monoethyl ether, diethylene glycol monoethyl ether acetate, diethylene glycol diethyl ether, diethylene glycol monobutyl ether, diethylene glycol monobutyl ether acetate, dipropylene glycol monomethyl ether acetate, dipropylene glycol-n-butylacetate, cyclohexanone, cyclopentanone, ethyl lactate, methyl lactate, butyl acetate, cyclohexyl acetate, 2-heptanone, ethyl pyruvate, 3,5,5-trimethyl-2-cyclohexene-1-one, butyl lactate, propylene glycol, propylene glycol diacetate, propylene glycol-n-propyl ether acetate, propylene glycol phenyl ether acetate, propylene glycol monomethyl ether acetate, 2-ethylhexylacetate, 3-methoxy-3-methylbutylacetate, tripropylene glycol methylethylacetate, 1-methoxypropylacetate, N-methylpyrrolidone, N,N-dimethylacetamide, N,N-dimethylformamide, tetrahydrofuryl alcohol, and ethoxy propyl propionate. Among these, as the film formation assistant, diethylene glycol monoethyl ether acetate is preferable.

The organic solvent is preferably a solvent that exhibits an action (mainly, film formation proceeds in an application and drying step) of forming a film with polymer latex in a receptive layer, and this action is not an action which is only an action of the film formation assistant which is known in the related art.

In the coating liquid for forming the easily adhesive layer when the easily adhesive layer is formed from the aqueous emulsion including the fluorine-containing polymer, the film formation assistant is preferably added by 0.1 mass % to 3 mass %, more preferably added by 0.3 mass % to 2 mass %, and particularly preferably added by 0.5 mass % to 1.5 mass %, with respect to the total of the fluorine-containing polymer and the other synthetic resin component.

<<Matting Agent>>

As the matting agent, all of organic fine particles or inorganic fine particles can be used. For example, polymer fine particles such as polystyrene, polymethyl methacrylate (PMMA), a silicone resin, and a benzoguanamine resin and inorganic fine particles such as silica, calcium carbonate, magnesium oxide, and magnesium carbonate can be used. Examples of the commercially available products include crosslinking PMMA particles MR-2G (manufactured by Soken Chemical & Engineering Co., Ltd.), silica particles SEAHOSTAR KE-W10 (manufactured by Nippon Shokubai Co., Ltd.), and SNOW TEX XL (manufactured by Nissan Chemical Industries, Ltd.).

Organic fine particles or inorganic fine particles may be used singly or in combination of two or more types thereof.

In the coating liquid for forming the easily adhesive layer when the easily adhesive layer is formed from the aqueous emulsion including the fluorine-containing polymer, the matting agent is preferably added by 0.1 mg/m$^2$ to 100 mg/m$^2$ and particularly preferably added by 0.5 mg/m$^2$ to 50 mg/m$^2$.

<<Lubricant>>

As the lubricant, aliphatic wax or the like is appropriately used.

Specific examples of the aliphatic wax include vegetable waxes such as a carnauba wax, a candelilla wax, a rice wax, Japan wax, jojoba oil, a palm wax, a rosin-modified wax, an ouricury wax, a sugar cane wax, an esparto wax, and a bark wax; an animal wax such as a bees wax, lanolin, a whale wax, an insect wax, or a shellac wax; a mineral wax such as a montan wax, ozocerite, or a ceresin wax; a petroleum-based wax such as a paraffin wax, a microcrystalline wax, or a petrolatum; and a synthetic hydrocarbon-based wax such as a Fischer-Tropsch wax, a polyethylene wax, a polyethylene oxide wax, a polypropylene wax, or a polypropylene oxide wax. Among these, a carnauba wax, a paraffin wax, and a polyethylene wax are particularly preferable. These are preferably used as a water dispersion because of a small environmental load and excellent handleability. Examples of the commercially available product include CELLOSOL 524 (manufactured by Chukyo Yushi Co., Ltd.)

The lubricant may be used singly or in combination of two or more types thereof.

In the coating liquid for forming the easily adhesive layer when the easily adhesive layer is formed from the aqueous emulsion including the fluorine-containing polymer, the lubricant is preferably added by 0.1 mg/m$^2$ to 100 mg/m$^2$ and particularly preferably added by 0.5 mg/m$^2$ to 50 mg/m$^2$.

<<Surfactant>>

Examples of the surfactant include well-known anionic, non-ionic, cationic, fluorine-based, and silicone-based surfactants. For example, surfactants are disclosed in "Handbook of Surfactants" (edited by Ichiro Nishi, Ichiro Imai, and Masatake Kasai, Sangyo-Tosho Publishing Co., Ltd., published in 1960). Among these, an anionic surfactant and/or a nonionic surfactant is preferable.

Examples of the commercially available anionic surfactants include RAPISOL A-90, RAPISOL A-80, RAPISOL BW-30, RAPISOL B-90, and RAPISOL C-70 (Product Name, manufactured by NOF Corporation), NIKKOLOTP-100 (Product Name, manufactured by Nikko Chemical Co., Ltd.), KOHACOOL ON, KOHACOOL L-40, and PHOSPHANOL 702 (manufactured by Toho Chemical Industry Co., Ltd.), and BEAULIGHT A-5000 and BEAULIGHT SSS (manufactured by Sanyo Chemical Industries, Ltd.).

Examples of the commercially available non-ionic surfactants include NAROACTY CL-95 and HN-100 (trade name, manufactured by Sanyo Chemical Industries, Ltd.), LITHO REX BW400 (manufactured by Kokyu Alcohol Kogyo Co., Ltd.), EMALEX ET-2020 (Nihon Emulsion Co., Ltd.), and UNILUBE 50 MB-26 and NONION IS-4 (manufactured by NOF Corporation).

Examples of the fluorine-based surfactant include MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, MEGAFACE F780, and MEGAFACE F781 (all manufactured by DIC Corporation), FLUORAD FC430, FLUORAD FC431, and FLUORAD FC171 (all manufactured by Sumitomo 3M Limited), SURFLON S-382, SURFLON SC-101, SURFLON SC-103, SURFLON SC-104, SURFLON SC-105, SURFLON SC1068, SURFLON SC-381, SURFLON SC-383, SURFLON S393, and SURFLON KH-40 (all manufactured by ASAHI GLASS CO., LTD.), PF636, PF656, PF6320, PF6520, and PF7002 (manufactured by OMNOVA Solutions Inc.).

Examples of the commercially available cationic surfactants include a phthalocyanine derivative (Product Name, EFKA-745, manufactured by Morishita & Co., Ltd.), organosiloxane polymer KP341 (manufactured by Shin-Etsu Chemical Co., Ltd.), (meth)acrylic acid (co)polymer POLY-FLOW No. 75, No. 90, and No. 95 (manufactured by Kyoeisha Chemical Co., Ltd.), and W001 (manufactured by Yusho Co., Ltd.).

Examples of the commercially available silicone-based surfactants include "TORAY SILICONE DC3PA", "TORAY SILICONE SH7PA", "TORAY SILICONE DC11PA", "TORAY SILICONE SH21PA", "TORAY SILICONE SH28PA", "TORAY SILICONE SH29PA", "TORAY SILICONE SH30PA", and "TORAY SILICONE SH8400" from Dow Corning Toray Co., Ltd.; "TSF-4440", "TSF-4300", "TSF-4445", "TSF-4460", and "TSF-4452" from Momentive Performance Materials Inc.; "KP341", "KF6001", and "KF6002" from Shin-Etsu Silicone, Co., Ltd.; and "BYK307", "BYK323", and "BYK330" from BYK Japan KK.

The surfactants may be used singly or in combination of two or more types thereof.

In the coating liquid for forming the easily adhesive layer when the easily adhesive layer is formed from the aqueous emulsion including the fluorine-containing polymer, the surfactant is preferably added by 0.1 mg/m$^2$ to 10 mg/m$^2$, more preferably added by 0.3 mg/m$^2$ to 5 mg/m$^2$, and particularly preferably added by 0.5 mg/m$^2$ to 3 mg/m$^2$.

(Forming of Easily Adhesive Layer)

In the film according to the invention, the easily adhesive layer is preferably formed from the aqueous emulsion including the fluorine-containing polymer.

In the film according to the invention, the minimum film formation temperature (MFT) of the aqueous emulsion is preferably 30° C. or lower, more preferably 20° C. or lower, and particularly preferably 10° C. or lower. The minimum film formation temperature of the aqueous emulsion can be adjusted by changing the composition of the fluorine-containing polymer.

(Characteristics of Easily Adhesive Layer)

In the film according to the invention, the water content of the easily adhesive layer is preferably 0.3 to 2.5%, more preferably 0.4 to 1.0%, and particularly preferably 0.4 to 0.8%. If the water content of the easily adhesive layer is 0.3% or greater, adhesiveness of the film according to the invention in a dry state described below can be improved. If the water content of the easily adhesive layer is 2.5% or less, adhesiveness of the film according to the invention in a wet state can be improved.

In the film according to the invention, the thickness of the easily adhesive layer is preferably 40 nm to 400 nm, more preferably 60 nm to 250 nm, and particularly preferably 60 nm to 150 nm. If the thickness of the easily adhesive layer is in the preferable range, adhesiveness of the film according to the invention in a wet state can be improved.

The easily adhesive layer may be a single layer or two or more layers, but the easily adhesive layer is preferably a single layer.

<Layer A>

In the film according to the invention, it is preferable the film further includes a layer A, the layer A having a water contact angle of 70° or less is preferably laminated adjacent to the easily adhesive layer on the surface on the opposite side of the surface in contact with the substrate among both surfaces of the easily adhesive layer.

The water contact angle of the layer A is preferably 60° or less and preferably 55° or less.

In the film according to the invention, the layer A preferably includes a hydrophilic resin, in view of causing the water contact angle to be in the range. A preferable aspect of the hydrophilic resin that can be used in the layer A is the same as the preferable aspect of the hydrophilic resin that can be used in the photosensitive material of the transparent conductive layer. The layer A more preferably includes a gelatin among the hydrophilic resins.

In the film according to the invention, the layer A preferably includes a dye, in view of providing an antireflection (antihalation) function to the layer A.

Examples of the dye that can be used in the layer A include dyes disclosed in "0064" to "0068" of JP2012-6377A, and the contents of this publication are incorporated to this specification. Among these, a solid dispersion dye A described below is preferable.

Solid Dispersion Dye A

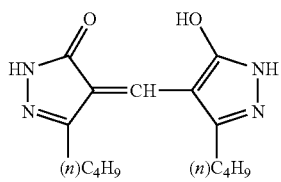

In the film according to the invention, in view of visual recognition enhancement, the thickness of the layer A is preferably 0.2 μm to 10 μm and particularly preferably 0.5 μm to 5 μm.

As another preferable aspect of the layer A, preferable aspects of the well-known antihalation layer can be employed. For example, aspects disclosed in the entire document of JP2012-6377A can be used, and thus the contents of this publication are incorporated with this specification.

<Photosensitive Material Layer for Forming Transparent Conductive Layer>

In the film according to the invention, it is preferable that a photosensitive material layer for forming the transparent conductive layer is further laminated on the surface on the opposite side of the surface in contact with the easily adhesive layer among both surfaces of the layer A. Examples of the photosensitive materials for the transparent conductive layer include a silver salt photosensitive material.

The photosensitive material layer for forming the transparent conductive layer preferably includes metal salt and a binder and more preferably includes silver salt and a binder.

As the binder, a hydrophilic resin is preferable. Examples of the hydrophilic resin used in the photosensitive material for forming the transparent conductive layer include a gelatin, polyvinyl alcohol (PVA), polyvinylpyrrolidone (PVP), polysaccharide such as starch, cellulose and derivatives thereof, polyethylene oxide, polyvinyl amine, chitosan, polylysine, polyacrylic acid, polyalginic acid, polyhyaluronic acid, and carboxy cellulose. These have neutral, anionic, and cationic characteristics depending of ionicity of a functional group. Among these, a gelatin is particularly preferable.

Examples of the silver salt include inorganic silver salt such as silver halide and organic silver salt such as silver acetate. According to the invention, it is preferable to use silver halide having excellent characteristics, as an optical sensor.

The photosensitive material layer for forming the transparent conductive layer may contain additives such as a solvent or a dye, in addition to the metal salt such as silver salt and a binder.

The solvent used in the formation of the photosensitive material layer (preferably a silver salt emulsion layer) for forming the transparent conductive layer is not particularly limited, and examples thereof include water, an organic solvent (for example, alcohols such as methanol, ketones such as acetone, amides such as formamide, sulfoxides such as dimethyl sulfoxide, esters such as ethyl acetate, ethers, and the like), ionic liquid, and a mixed solvent thereof.

In a case where the film according to the invention is used in the touch panel, as the thickness of the conductive pattern is thinner, the conductive pattern is preferable since an angle view of a display panel is widened. In view of enhancement of the visual recognizability, the reduction of the film thickness of the conductive pattern is required. In this point of view, the thickness of the photosensitive material layer for forming the transparent conductive layer is preferably 0.1 μm to 9 μm, more preferably 0.5 μm to 5 μm, and particularly preferably 0.5 μm to 3 μm.

<Protective Layer>

A protective layer may be provided on the photosensitive material layer for forming the transparent conductive layer. An example of the transparent conductive film 20 according to the invention having the protective layer 12 is represented in FIG. 1. The protective layer according to the invention means a layer consisting of a binder such as a gelatin or a high molecular polymer, and formed on the photosensitive material layer for forming the transparent conductive layer having photosensitivity in order to exhibit scratch protection or an effect of improving mechanical characteristics. The thickness thereof is preferably 0.5 μm or less. The method of applying and forming the protective layer is not particularly limited, and well-known application methods and forming methods can be appropriately selected. For example, with respect to the protective layer, description of JP2008-250233A can be referred to.

<Other Functional Layers>

According to the invention, another functional layer called an antistatic layer may be provided. As the functional layer, layers disclosed in paragraphs "0012" and "0014" to "0020" of JP2008-250233A can be applied.

<Other Uses>

The film according to the invention may be used in addition to the use for the transparent conductive film.

(Antireflection Film)

The film according to the invention can be used as a support of the antireflection film. In a case of a high definition and high quality image display device such as a liquid crystal display device (LCD), in addition to dust resistance, it is preferable to use a transparent antireflection film having antistatic characteristics for preventing decrease in contrast due to reflection of external light on the display surface or reflected glare of an image.

(Surface Protective Film)

The film according to the invention may be used as a surface protective film. For example, this film can be used as a protective film for a polarizing plate. The film according to the invention is appropriately used as a display film for a display device.

(Display Device)

The polarizing plate having the film according to the invention or the film according to the invention described above can be used in various display devices such as a liquid crystal display device (LCD), a plasma display panel (PDP), an electroluminescent display (ELD), or a cathode ray tube display device (CRT). The film according to the invention or the polarizing plate is preferably disposed on the visual recognition side of the display screen of the image display device.

[Method for Producing Film]

The method for producing the film according to the invention includes directly applying the coating liquid for forming the easily adhesive layer on the substrate including the cyclic olefin-based resin and laminating the easily adhesive layer and is characterized in that the fluorine-containing polymer is included in the coating liquid for forming the easily adhesive layer in the amount of greater than 20 mass % with respect to the entire coating liquid for forming the easily adhesive layer.

The method for producing the film according to the invention includes directly applying a coating liquid for forming the layer A on the easily adhesive layer and laminating the layer A and the layer A preferably has a water contact angle of 70° or less.

In the method for producing the film according to the invention, the coating liquid for forming the layer A preferably includes a gelatin.

The method for producing the film according to the invention preferably includes directly applying an emulsion of a photosensitive material for forming a transparent conductive layer on the layer A and laminating a photosensitive material layer for forming the transparent conductive layer.

According to the preferable aspect of this method for producing the film according to the invention, the film according to the invention in the preferable aspect can be produced. Specifically, a film which is adjacent to two layers which are a substrate and an easily adhesive layer (without an adhesive agent interposed therebetween) can be formed.

A preferable aspect of the method for producing the film according to the invention is the same as the preferable aspect of the film according to the invention. In a case where the substrate is a laminate of the layer including the cyclic olefin-based resin and another layer, the easily adhesive layer is laminated by directly applying the coating liquid for forming the easily adhesive layer on the layer including the cyclic olefin-based resin of the substrate.

[Transparent Conductive Film]

The transparent conductive film according to the invention has characteristics of having the film according to the invention and the transparent conductive layer. In this case, the transparent conductive layer may be formed by using materials other than the material used in the photosensitive material layer for forming the transparent conductive layer.

The transparent conductive film according to the invention may be a film in which a transparent conductive layer is formed by exposing and developing the photosensitive material layer for forming the transparent conductive layer of the film according to the invention.

The film according to the invention may be used in the transparent conductive film.

The transparent conductive layer may be formed in a layer shape, but preferably formed so as to have a intermittent portion. The intermittent portion refers to a portion in which the transparent conductive layer is not provided. The circumference of the intermittent portion is preferably surrounded by the transparent conductive layer. In the invention, forming the transparent conductive layer so as to have the intermittent portion is also referred to as forming the transparent conductive layer in a pattern shape or forming the transparent conductive layer in a mash shape. Examples of the transparent conductive layer include transparent conductive layers disclosed, for example, in JP2013-1009A, JP2012-216550A, JP2012-151095A, JP2012-25158A, JP2011-253546A, JP2011-197754A, JP2011-34806A, JP2010-198799A, JP2009-277466A, JP2012-216550A, JP2012-151095A, WO2010/140275A, and WO2010/114056A.

The transparent conductive layer used in the invention more preferably includes silver and a hydrophilic resin. The preferable aspect of the hydrophilic resin that can be used in the transparent conductive layer is the same as the preferable aspect of the hydrophilic resin that can be used in the photosensitive material layer for forming the transparent conductive layer.

A layer derived from a silver halide photosensitive material is particularly preferably used on the transparent conductive layer used in the invention. As described above, the transparent conductive layer of the transparent conductive film according to the invention may be a layer formed by exposing and developing the photosensitive material layer (preferably a silver salt photosensitive material layer) for forming the transparent conductive layer of the film according to the invention. In a case of using the silver halide photosensitive material, the method for producing the transparent conductive layer includes three methods as follows depending on aspects of photosensitive materials and developing treatments:

(1) an aspect of forming a metal silver portion (hereinafter, referred to as "developed silver") on a photosensitive material by chemically or thermally developing a photosensitive silver halide black and white photosensitive material that does not include a physical developing nucleus, (2) an aspect of forming a metal silver portion on the photosensitive material by dissolving and physically developing a photosensitive silver halide black and white photosensitive material including a physical developing nucleus in a silver halide emulsion layer, and (3) an aspect of forming a metal silver portion on a non-photosensitive image receiving sheet by overlapping a photosensitive silver halide black and white photosensitive material that does not include a physical developing nucleus and an image receiving sheet having a non-photosensitive layer that includes a physical developing nucleus and performing diffusion transfer development.

In the aspect (1) above, a light transmitting conductive layer in an integral black and white developing type such as an optically transparent conductive layer is formed on a photosensitive material. The obtained developed silver is a chemically developed silver or thermally developed silver and is a filament having a high specific surface area, and thus has high activity in a plating or physical development process described below.

In the aspect (2) above, silver halide particles which are closely relative to physical developing nuclei are dissolved and deposited on the developing nuclei in the exposure portion, and thus a light transmitting conductive layer such as an optically transparent conductive layer is formed on the photosensitive material. This is also in an integral black and white developing type. The development action is deposition on the physical developing nuclei, and thus is highly active but the developed silver has a spherical shape having a small specific surface area.

In the aspect (3) above, silver halide particles are dissolved and dispersed in the unexposed portion and deposited on the developing nuclei on the image receiving sheet, so as to form a light transmitting conductive layer such as an optically transparent conductive layer on the image receiving sheet. The light transmitting conductive layer is in a so-called separate type and is in the aspect in which the image receiving sheet is released from the photosensitive material to be used.

In all aspects, it is possible to select any of a negative tone development and a reverse tone development. In a case of the diffusion transfer development method, a negative development treatment can be performed by using an auto positive photosensitive material, as the photosensitive material.

The chemical development, the thermal development, the dissolution physical development, and the diffusion transfer development have the same meaning as the terms generally used in the art, and the terms are in a general text book of photographic chemical, for example, "photographic chemical" written by Kikuchi Shinichi (issued by Kyoritsu Shuppan Co., Ltd. in 1955) and "The Theory of Photographic Processes, 4th ed." edited by C. E. K. Mees (issued by Mcmillan Publishers Ltd. in 1977). This case is an invention relating to a liquid treatment, but techniques of applying thermal development as another development method may be referred to. For example, techniques disclosed in respective publications of JP2004-184693A, JP2004-334077A, and JP2005-010752A and the specification of JP2006-154700A can be applied.

[Touch Panel]

The transparent conductive film described above is highly appropriate for the use of a touch panel, and a touch panel can be created according to the disclosure in paragraphs "0073" to "0075" of JP2009-176608A.

The touch panel according to the invention has a transparent conductive film according to the invention.

EXAMPLES

The characteristics of the invention are more specifically described below with reference to examples and comparative examples. Materials, use amounts, ratios, treatment details, treatment methods, or the like represented in the following examples can be appropriately changed without departing from the gist of the invention. Accordingly, the scope of the invention is not interpreted in a limited manner by the specific example represented below.

Abbreviations in the examples represent the following meanings.

CTFE: Chlorotrifluoroethylene.
EVE: Ethyl vinyl ether.
CHVE: Cyclohexyl vinyl ether.
HBVE: 4-Hydroxybutyl vinyl ether.

Synthesis Example 1-1

LUMIFLON flakes (CTFE:EVE:CHVE:HBVE=50:15: 15:20) manufactured by Asahi Glass Co., Ltd. was dissolved in methyl ethyl ketone (MEK) so as to obtain varnish having the solid content of 60 mass %.

Synthesis Example 1-2

4.8 g of succinic anhydride and 0.072 g of triethylamine as a catalyst were added to 300 g of the obtained varnish, reaction was performed at 70° C. for six hours, and esterification was performed. The infrared absorption spectrum of the reaction liquid was measured, it was found that absorption spectrums (1,850 cm$^{-1}$ and 1,780 cm$^{-1}$) of anhydride which were observed before the reaction were disappeared after the reaction and absorption spectrums of carboxylic acid (1,710 cm$^{-1}$) and ester (1,735 cm$^{-1}$) were observed. The hydroxy group value of the fluorine-containing copolymer (1-2) after esterification presented in Table 1 below was 85 mg/KOH and the acid value thereof was 15 mgKOH/g.

Synthesis Example 1-3

Subsequently, carboxylic acid was neutralized by adding 4.9 g of triethylamine to the fluorine-containing copolymer (1-3) after esterification, and performing stirring for 20 minutes at room temperature. Subsequently, 160 g of ion exchange water was gradually added thereto. Finally, methyl ethyl ketone was distilled away at reduced pressure. 20 g of ion exchange water was further added, so as to obtain the fluorine-containing polymer solution (A) having the solid content concentration of 50 mass % including 50 mol % of a structural unit derived from the monomer represented by Formula (a1) described in Table 1 below, 30 mol % of a structural unit derived from a monomer represented by Formula (a2), 18 mol % of a structural unit derived from a monomer represented by Formula (a3), and 2 mol % of a structural unit represented by Formula (a4), which is a neutralized product of succinic anhydride ester not presented in Table 1 below.

Synthesis Example 2

590 g of xylene, 170 g of ethanol, 79 g of EVE, 14 g of HBVE, 11 g of calcium carbonate, and 3.5 g of perbutyl perpivalate (hereinafter, referred to as PBPV) as a polymerization initiator were added to a pressure resistant reaction vessel with a stainless steel stirrer having an internal volume of 2,500 ml, dissolved oxygen in the liquid was removed by degassing with nitrogen. Subsequently, 1,287 g of CTFE was added, the temperature was gradually increased, the reaction temperature was maintained at 65° C., and the reaction was continued. After ten hours, the reaction vessel was cooled with water, and the reaction was stopped. After the reaction liquid was cooled to room temperature, an unreacted monomer was purged, the obtained reaction liquid was filtrated with diatom earth, and a solid product was removed. Subsequently, a portion of xylene and ethanol were removed by distillation at reduced pressure, and a fluorine-containing polymer solution (2-1) described in Table 1 below was obtained. The hydroxy group value of the fluorine-containing polymer was 50 mgKOH/g, the solid content concentration of the fluorine-containing polymer solution was 60%.

A fluorine-containing polymer solution (B) were obtained in the same manner as in Synthesis Examples 1-2 and 1-3 except for using the fluorine-containing polymer solution (2-1) instead of LUMIFLON flakes. The fluorine-containing polymer solution (B) includes 90 mol % of the structural unit derived from the monomer represented by Formula (a1), 9 mol % of the structural unit derived from the monomer represented by Formula (a2), 0.8 mol % of the structural unit derived from the monomer represented by Formula (a3), and 0.2 mol % of the structural unit represented by Formula (a4) which is the neutralized product of the succinic anhydride ester not presented in Table 1 below. The solid content concentration of the fluorine-containing polymer solution was 50%.

Synthesis Example 3

3,000 ml of deionized water was input to an autoclave with a stainless stirrer having an internal volume of 6,000 ml, 12 g of an emulsifying agent (CF$_3$CF$_2$CF$_2$C(CF$_3$)$_2$CH$_2$CH$_2$COONH$_4$) was added thereto, and then 1.2 g of ammonium persulfate (APS) as the initiator was added. After nitrogen substitution was sufficiently performed in the autoclave, CTFE was pumped until the pressure inside the autoclave became 0.8 MPa. The solution in the autoclave was heated to 70° C. and polymerization was initiated. Along with the progress of the polymerization, the pressure in the polymerization system decreases. Therefore, while CTFE was additionally pumped such that the pressure inside the autoclave was maintained to 0.8 MPa, 80 g of acrylic acid (AA) was added dropwisely over 24 hours to proceed the polymerization. Thereafter, the pressure in the vessel was returned to 1 atmospheric pressure, the temperature was decreased to 25° C., and the polymerization was completed, such that a fluorine-containing polymer solution (3-1) described in Table 1 was obtained.

pH was adjusted by using NH$_4$OH such that the pH of the obtained fluorine-containing polymer solution (3-1) became 9, and the fluorine-containing polymer solution (3-1) after the pH adjustment was filtrated with a filter cloth having 400 meshes, so as to obtain the fluorine-containing polymer solution (C) including the structural unit derived from the monomer represented by Formula (a1) and the structural unit derived from acrylic acid. The solid content concentration of the fluorine-containing polymer solution was 25 mass %.

Synthesis Example 4

590 g of xylene, 170 g of ethanol, 74 g of EVE, 124 g of CHVE, 155 g of HBVE, 11 g of calcium carbonate, and 3.5 g of PBPV were added to a pressure resistant reaction vessel with a stainless steel stirrer having an internal volume of 2,500 ml, and dissolved oxygen in the liquid was removed by degassing with nitrogen. Subsequently, 924 g of CTFE was added, the temperature was gradually increased, the reaction temperature was maintained at 65° C., and the reaction was continued. After ten hours, the reaction vessel was cooled with water, and the reaction was stopped. After the reaction liquid was cooled to room temperature, an unreacted monomer was purged, the obtained reaction liquid was filtrated with diatom earth, and a solid product was removed. Subsequently, a portion of xylene and ethanol were removed by distillation at reduced pressure, so as to obtain the fluorine-containing polymer solution (4-1) including the monomer unit described in Table 1. The solid content concentration of the fluorine-containing polymer solution was 60%.

A fluorine-containing polymer solution (D) were obtained in the same manner as in Synthesis Examples 1-2 and 1-3 except for using the fluorine-containing polymer solution (4-1) instead of LUMIFLON flakes. The fluorine-containing polymer solution (D) includes 70 mol % of the structural unit derived from the monomer represented by Formula (a1), 18 mol % of the structural unit derived from the monomer represented by Formula (a2), 11 mol % of the structural unit derived from the monomer represented by Formula (a3), and 1 mol % of the structural unit represented by Formula (a4) which is the neutralized product of the succinic anhydride ester not presented in Table 1 below. The solid content concentration of the fluorine-containing polymer solution was 50%.

The mix ratios of raw material components and respective raw materials before esterification are presented in Table 1.

Example 1

Laminating of Easily Adhesive Layer

A corona discharge treatment was performed in the condition of 8 kJ/m$^2$ on the surface on one side of ARTON D4540 (manufactured by JSR Corporation, film thickness: 40 μm) which is a cyclic olefin-based resin film used as the substrate. The coating liquid for forming the easily adhesive layer in which respective components were mixed in the formulation represented in Table 2 below was applied to the surface on the side on which a corona discharge treatment of the substrate was performed such that the film thickness after the drying became 70 nm, and drying was performed at 60° C. for one minute to obtain a film with an easily adhesive layer.

<Laminating of Layer A and Photosensitive Material Layer (Emulsion Layer)>

(Layer A; Antihalation (AH) Layer)

A coating liquid (coating liquid for forming the layer A) including 84 g of the solid dispersion dye A below in 100 g of gelatin was prepared. In addition, a water contact angle to the layer A (AH layer) which was measured by performing a separate test was 52°.

Solid Dispersion Dye A

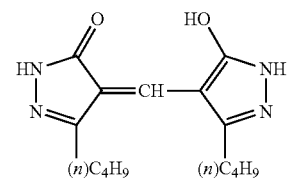

(Preparing of Silver Halide Emulsion)

Respective amounts of Liquid 2 and Liquid 3 below corresponding to 90% were simultaneously added to Liquid 1 below which was maintained at 38° C. and pH 4.5 over 20 minutes while stirring, nucleus particles of 0.16 μm were formed in the obtained mixture liquid. Subsequently, Liquid 4 and Liquid 5 below were added to the obtained mixture liquid over eight minutes, remaining amounts of Liquid 2 and Liquid 3 below corresponding to 10% were added thereto over two minutes, so as to grow the nucleus particles to 0.21 μm. After 0.15 g of potassium iodide was added thereto, ripening was performed for five minutes, and particle formation was completed.

TABLE 1

| Fluorine-containing polymer | Fluorine components | | Copolymerization components (raw materials) | | | | | |
|---|---|---|---|---|---|---|---|---|
| | Component | Mix ratio before esterification | Component | Mix ratio before esterification | Component | Mix ratio before esterification | Component | Mix ratio before esterification |
| A | Chlorotrifluoroethylene (CTFE) | 50 | Ethyl vinyl ether (EVE) | 15 | Cyclohexyl vinyl ether (CHVE) | 15 | 4-Hydroxybutyl vinyl ether (HBVE) | 20 |
| B | Chlorotrifluoroethylene (CTFE) | 90 | Ethyl vinyl ether (EVE) | 9 | — | — | 4-Hydroxybutyl vinyl ether (HBVE) | 1 |
| C | Chlorotrifluoroethylene (CTFE) | 90 | Acrylic acid (AA) | 10 | — | — | — | — |
| D | Chlorotrifluoroethylene (CTFE) | 70 | Ethyl vinyl ether (EVE) | 9 | Cyclohexyl vinyl ether (CHVE) | 9 | 4-Hydroxybutyl vinyl ether (HBVE) | 12 |

Liquid 1:

| Water | 750 ml |
|---|---|
| Gelatin | 8.6 g |
| Sodium chloride | 3 g |
| 1,3-dimethylimidazolidine-2-thione | 20 mg |
| Sodium benzenethiosulfonate | 10 mg |
| Citric acid | 0.7 g |

Liquid 2:

| Water | 300 ml |
|---|---|
| Silver nitrate | 150 g |

Liquid 3:

| Water | 300 ml |
|---|---|
| Sodium chloride | 38 g |
| Potassium bromide | 32 g |
| Potassium hexachloroiridate (III) (0.005% KCl 20% water solution) | 5 ml |
| Ammonium hexachlororhodate (0.001% NaCl 20% water solution) | 7 ml |

Liquid 4:

| Water | 100 ml |
|---|---|
| Silver nitrate | 50 g |

Liquid 5:

| Water | 100 ml |
|---|---|
| Sodium chloride | 13 g |
| Potassium bromide | 11 g |
| Yellow prussiate of potash | 5 mg |

Thereafter, water washing was performed by a flocculation method in a usual manner. Specifically, the temperature of the solution after the particle formation was decreased to 35° C., pH was reduced until particles (silver halide) were precipitated by using sulfuric acid (in the range of pH 3.6±0.2).

Subsequently, three liters of the supernatant was removed (first water washing). Three liters of distilled water was further added, and sulfuric acid was added until silver halide was precipitated. Three liters of the supernatant was further removed (second water washing). The same operation as the second water washing was further repeated once (third water washing), so as to obtain emulsion (a step including first water washing to third water washing is referred to as "water washing•desalination step".)

The emulsion after the water washing•desalination step was adjusted to pH 6.4 and pAg 7.5, 2.5 g of gelatin, 10 mg of sodium benzenethiosulfonate, 3 mg of sodium benzenethiosulfinate, 15 mg of sodium thiosulfate, and 10 mg of gold chloride were added thereto, and chemical sensitization was performed so as to obtain optimum sensitivity at 55° C. Subsequently, 100 mg of 1,3,3a,7-tetraazaindene as a stabilizing agent and 100 mg of PROXEL (Product name, manufactured by ICI Co., Ltd.) as a preservative were added thereto.

The finally obtained emulsion was silver iodochlorobromide cube particle emulsion which includes 0.08 mol % of silver iodide, in which the ratio of silver bromide was 70 mol % of silver chloride and 30 mol % of silver chlorobromide, and which has an average particle diameter of 0.22 μm and coefficient variation of 9%.

(Preparing of Composition for Forming Photosensitive Material Layer)

$1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, 0.90 g/mol Ag of 2,4-dichloro-6-hydroxy-1,3,5-triazine sodium salt, and a small amount of a film hardening agent were added to the emulsion, and pH was adjusted to 5.6 by using citric acid, so as to obtain a composition for forming a photosensitive material layer.

(Film with Photosensitive Material Layer for Forming Transparent Conductive Layer)

Simultaneous double-layer coating was performed with a gelatin film hardening agent such that the substrate, the easily adhesive layer, the layer A, and the photosensitive material layer for forming the transparent conductive layer (silver halide photosensitive material layer) were formed in this sequence on the prepared film with the easily adhesive layer such that a coating amount of silver (amount of coating silver) in a silver halide photosensitive material became 7 g/m² in terms of silver, and a film thickness of the layer A became 1 μm. At this point, the volume ratio of Ag and gelatin in the photosensitive material layer for forming the transparent conductive layer was 2/1. Coating was performed to have the width of 25 cm and to be 20 m on the film with the easily adhesive layer having the width of 30 cm, and both ends were cut by 3 cm each such that the center portion of the coating remains by 24 cm, so as to obtain the film with the photosensitive material layer for forming the roll-shaped transparent conductive layer.

The film with the photosensitive material layer for forming the obtained transparent conductive layer was set to be a film of Example 1.

Examples 2, 9, and 10 and Comparative Examples 1 to 4

Films of Examples 2, 9, and 10 and Comparative Examples 1 to 4 were obtained in the same manner as Example 1 except for changing binders to be used as in Table 2 below.

In Example 2, in the coating liquid for forming the easily adhesive layer, the ratio of the solid content of the fluorine-containing polymer in a binder A and the solid content of gelatin in binder E was calculated to be 85:15.

Example 3

A film of Example 3 was obtained in the same manner as Example 1 except for changing a type of the binder to be used and an addition amount of the film formation assistant as in Table 2 below.

Examples 4 to 8

Films of Examples 4 to 8 were obtained in the same manner as in Example 1 except for changing thicknesses of the films as in Table 2 below.

Examples 11 and 12

Films of Examples 11 and 12 were obtained in the same manner as in Example 1 except for changing an addition amount of the film formation assistant as in Table 2 below.

In the respective examples, respective components were mixed in the formulation represented in Table 2 below, so as to obtain the coating liquid for forming the easily adhesive layer. A unit of a formulation amount in Table 2 below was a part by mass.

Respective components in Table 2 below are as below.

Binder A: Fluorine-containing polymer A of Table 1 above (Solid content: 50 mass %)

Binder B: Fluorine-containing polymer B of Table 1 above (Solid content: 50 mass %)

Binder C: Fluorine-containing polymer C of Table 1 above (Solid content: 25 mass %)

Binder D: Fluorine-containing polymer D of Table 1 above (Solid content: 50 mass %)

Binder E: Gelatin (manufactured by Nitta Gelatin Inc. 20% aqueous solution)

Binder F: Olefin-based polymer (ARROWBASE SE-1013N, manufactured by Unitika Ltd., Solid content: 20.2 mass %)

Binder G: Acrylic polymer (AS-563A, manufactured by Daicel Finechem Ltd., Solid content: 28 mass %)

Binder H: Urethane-based polymer (TAKELAC WS5100, manufactured by Mitsui Chemicals, Inc., Solid content: 30 mass %)

Binder I: Urethane-based polymer (SUPERFLEX 460, manufactured by DKS Co. Ltd., Solid content: 38 mass %)

Crosslinking agent A: Carbodiimide compound (CARBODILITE V-02-L2, manufactured by Nisshinbo Holdings Inc., Solid content: 10 mass %)

Film formation assistant A: Diethylene glycol monoethyl ether acetate

Matting agent A: Colloidal silica (SNOW TEX XL, manufactured by Nissan Chemical Industries, Ltd., Solid content: 10% water dilution)

Lubricant A: Carnauba wax (CELLOSOL 524, manufactured by Chukyo Yushi Co., Ltd., Solid content: 3% water dilution)

Surfactant A: Surfactant (NAROACTY CL95, manufactured by Sanyo Chemical Industries, Ltd., Solid content: 1% aqueous solution)

Surfactant B: Surfactant (RAPISOL A-90, manufactured by NOF Corporation, solid content: 1% aqueous solution)

[Characteristics of Easily Adhesive Layer]

(Minimum Film Formation Temperature (in Conformity with ASTM-D2354-65T))

The minimum film formation temperatures (MFT) of the emulsion used in the formation of the easily adhesive layer of the films of the respective examples and the respective comparative examples were measured in the following methods.

The minimum film formation temperatures were measured by using a minimum film formation temperature (MFT) test device manufactured by Yoshimitsu Seiki Co., Ltd.

(Water Content)

The water contents of the easily adhesive layers of the films of the respective examples and the respective comparative examples were measured in the following method.

After the easily adhesive layer coating film was maintained at 23° C. and under relative humidity of 50% for 24 hours, the water content was measured by using a Karl Fischer moisture meter (a Karl Fischer moisture meter MKC-610 and moisture vaporizer ADP611 manufactured by Kyoto Electronics Manufacturing Co., Ltd.) and heating the easily adhesive layer coating film to 200° C.

(Film Thickness)

The film thicknesses of the easily adhesive layers of respective examples and the respective comparative examples were measured by an electronic micro film thickness meter manufactured by Anritsu Corporation.

[Evaluation]

(Wet Adhesiveness (Wet Scratch))

The films of the respective examples and the respective comparative examples which were the prepared films with the photosensitive material layers for forming the transparent conductive layers were maintained in an oven at 50° C. for 32 hours. Thereafter, the films were cut into a size of 12 cm×3 cm and immersed in distilled water at 24° C. for two minutes, and scratch tests were performed right after the immersion before the films were dried. The scratch tests were performed so as to check whether the coating films were peeled off by using a continuous load scratch strength tester (Model No. HEIDON-18, manufactured by Shinto Scientific Co., Ltd.) and scratching the coating films by a length of 10 cm under the conditions of a sapphire needle of 1.0 mmφ and a load of 200 g. A case where the coating film was peeled by 10 cm was set to be a load of 0 g and a case where the coating film was not peeled at all was set to be a load of 200 g, the load at which the film was peeled off was calculated from the length of the peeled coating film. It was considered that the coating film having a load of 75 g or greater was a practicable level. The load was preferably 95 g or greater and more preferably 110 g or greater.

When the films of the respective examples and the respective comparative examples were peeled off, the peeling occurred mainly between the substrate and the easily adhesive layer or between the easily adhesive layer and the layer A (antihalation layer).

Obtained results are presented in Table 2 below.

(Dry Adhesiveness)

The films of the respective examples and the respective comparative examples which were the prepared films with the photosensitive material layers for forming the transparent conductive layers were cut into a size of 12 cm×3 cm. After the films were maintained for one hour under the conditions of 23° C. and the relative humidity of 50%, polyimide tapes (No. 541, manufactured by Sumitomo 3M Limited) were attached onto the emulsion layers and peeled with hands at a peeling angle of 180°. Dry adhesiveness was graded to four ranks according to peeled areas. A film having Rank 2 or higher was determined to be in a practically preferable level. A film having Rank 3 or higher was determined to be in a practically more preferable level, and film having Rank 4 was determined to be in a practically particularly preferable level.

When the films of the respective examples and the respective comparative examples were peeled off, peeling occurred mainly between the easily adhesive layers and the antihalation layers.

Rank 4: A film was not peeled off at all.

Rank 3: A film was peeled off and a peeled area was less than 60% with respect to the attached area.

Rank 2: A peeled area was 60% or greater and less than 90% with respect to the attached area.

Rank 1: A peeled area was 90% or greater with respect to the attached area.

The obtained results were described in Table 2 below.

TABLE 2

| | | | | Example 1 | Example 2 | Example 3 | Example 4 | Example 5 | Example 6 | Example 7 | Example 8 |
|---|---|---|---|---|---|---|---|---|---|---|---|
| Easily adhesive layer | Coating liquid composition | Binder | Binder A | 1.9 | 1.6 | — | 1.9 | 1.9 | 1.9 | 1.9 | 1.9 |
| | | | Binder B | — | — | 1.9 | — | — | — | — | — |
| | | | Binder C | — | — | — | — | — | — | — | — |
| | | | Binder D | — | — | — | — | — | — | — | — |
| | | | Binder E | — | 0.7 | — | — | — | — | — | — |
| | | | Binder F | — | — | — | — | — | — | — | — |
| | | | Binder G | — | — | — | — | — | — | — | — |
| | | | Binder H | — | — | — | — | — | — | — | — |
| | | | Binder I | — | — | — | — | — | — | — | — |
| | | Crosslinking agent | Crosslinking agent A | 1.8 | 1.8 | 1.8 | 1.8 | 1.8 | 1.8 | 1.8 | 1.8 |
| | | Film formation assistant | Film formation assistant A | 0.01 | 0.01 | 0.03 | 0.01 | 0.01 | 0.01 | 0.01 | 0.01 |
| | | Matting agent | Matting agent A | 0.2 | 0.2 | 0.2 | 0.2 | 0.2 | 0.2 | 0.2 | 0.2 |
| | | Lubricant | Lubricant A | 1.5 | 1.5 | 1.5 | 1.5 | 1.5 | 1.5 | 1.5 | 1.5 |
| | | Surfactant | Surfactant A | 1.5 | 1.5 | 1.5 | 1.5 | 1.5 | 1.5 | 1.5 | 1.5 |
| | | | Surfactant B | 2.3 | 2.3 | 2.3 | 2.3 | 2.3 | 2.3 | 2.3 | 2.3 |
| | | Distilled water | | 90.9 | 90.4 | 90.9 | 90.9 | 90.9 | 90.9 | 90.9 | 90.9 |
| | | Total | | 100 | 100 | 100 | 100 | 100 | 100 | 100 | 100 |
| | Characteristics | Minimum film formation temperature (° C.) (MFT) | | 5 | 5 | 40 | 5 | 5 | 5 | 5 | 5 |
| | | Water content | | 0.8 | 3.0 | 0.25 | 0.8 | 0.8 | 0.8 | 0.8 | 0.8 |
| | | Film thickness (nm) | | 70 | 70 | 70 | 50 | 150 | 300 | 30 | 510 |
| Film evaluation | | Wet adhesiveness Wet scratch load (g) | | 135 | 80 | 110 | 95 | 110 | 85 | 75 | 75 |
| | | Dry adhesiveness | | 3 | 4 | 2 | 3 | 3 | 3 | 3 | 2 |

| | | | | Example 9 | Example 10 | Example 11 | Example 12 | Comparative Example 1 | Comparative Example 2 | Comparative Example 3 | Comparative Example 4 |
|---|---|---|---|---|---|---|---|---|---|---|---|
| Easily adhesive layer | Coating liquid composition | Binder | Binder A | — | — | 1.9 | 1.9 | — | — | — | — |
| | | | Binder B | — | — | — | — | — | — | — | — |
| | | | Binder C | 3.8 | — | — | — | — | — | — | — |
| | | | Binder D | — | 1.9 | — | — | — | — | — | — |
| | | | Binder E | — | — | — | — | — | — | — | — |
| | | | Binder F | — | — | — | — | 4.7 | — | — | — |
| | | | Binder G | — | — | — | — | — | 3.5 | — | — |
| | | | Binder H | — | — | — | — | — | — | 3.2 | — |
| | | | Binder I | — | — | — | — | — | — | — | 2.5 |
| | | Crosslinking agent | Crosslinking agent A | 1.8 | 1.8 | 1.8 | 1.8 | 1.8 | 1.8 | 1.8 | 1.8 |
| | | Film formation assistant | Film formation assistant A | 0.01 | 0.01 | 0.004 | — | 0.01 | 0.01 | 0.01 | 0.01 |
| | | Matting agent | Matting agent A | 0.2 | 0.2 | 0.2 | 0.2 | 0.2 | 0.2 | 0.2 | 0.2 |
| | | Lubricant | Lubricant A | 1.5 | 1.5 | 1.5 | 1.5 | 1.5 | 1.5 | 1.5 | 1.5 |
| | | Surfactant | Surfactant A | 1.5 | 1.5 | 1.5 | 1.5 | 1.5 | 1.5 | 1.5 | 1.5 |
| | | | Surfactant B | 2.3 | 2.3 | 2.3 | 2.3 | 2.3 | 2.3 | 2.3 | 2.3 |
| | | Distilled water | | 89.0 | 90.9 | 90.9 | 90.9 | 88.1 | 89.3 | 89.6 | 90.3 |
| | | Total | | 100 | 100 | 100 | 100 | 100 | 100 | 100 | 100 |
| | Characteristics | Minimum film formation temperature (° C.) (MFT) | | 30 | 30 | 30 | 40 | <5 | 50 | <5 | <5 |
| | | Water content | | 0.3 | 0.5 | 0.8 | 0.8 | 0.2 | 0.9 | 1.6 | 1.6 |
| | | Film thickness (nm) | | 70 | 70 | 70 | 70 | 70 | 70 | 70 | 70 |

TABLE 2-continued

| Film evaluation | Wet adhesiveness Wet scratch load (g) | 90 | 100 | 110 | 90 | 21 | 70 | 24 | 30 |
|---|---|---|---|---|---|---|---|---|---|
| | Dry adhesiveness | 3 | 3 | 3 | 3 | 1 | 3 | 3 | 3 |

According to Table 2 above, it was found that in a case where a cyclic olefin-based resin was used as a substrate, the films of the respective examples had favorable interlayer adhesiveness between the substrate and the functional layer such as the transparent conductive layer or the antihalation layer in a wet state.

Meanwhile, the films of Comparative Examples 1 to 4 were films in which a fluorine-containing polymer was not included in the easily adhesive layer, it was found that all of the films had deteriorated interlayer adhesiveness between the substrate and the functional layer such as the transparent conductive layer or the antihalation layer in a wet state.

Examples 101 to 112

Manufacturing of Transparent Conductive Film

Exposing and developing treatments were performed in the films with the photosensitive material layers for forming the transparent conductive layers which are the films of the respective examples manufactured above according to the description of "0084" and "0085" of JP2012-6377A, so as to obtain the transparent conductive films of Examples 101 to 112 on which transparent electrode layers in which the photosensitive material layers for forming the transparent conductive layers were converted to the transparent conductive patterns were formed.

<Manufacturing of Touch Panel>

The touch panels of Examples 101 to 112 were manufactured by using the transparent conductive films of Examples 101 to 112 described above according to the descriptions in "0074" and "0075" of JP2009-176608A. It was found that the touch panels of Examples 101 to 112 using the film according to the invention represented favorable performances.

INDUSTRIAL APPLICABILITY

The film according to the invention can be used in a transparent conductive film and a touch panel, and thus have high industrial applicability.

Explanation of References

1: substrate
2: easily adhesive layer
3: layer A (antihalation layer)
11: photosensitive material layer for forming transparent conductive layer
12: protective layer
20: film, transparent conductive film

What is claimed is:

1. A film comprising:
a substrate including a cyclic olefin-based resin; and
an easily adhesive layer that is laminated adjacent to the substrate,
wherein the content of a fluorine-containing polymer in the easily adhesive layer is greater than 20 mass % with respect to the total mass of the easily adhesive layer, and the water content of the easily adhesive layer is 0.3% to 2.5%.

2. The film according to claim 1,
wherein the thickness of the easily adhesive layer is 40 nm to 400 nm.

3. The film according to claim 2,
wherein the fluorine-containing polymer includes a structural unit represented by formula (a1) below and a structural unit derived from vinyl ether, and $$—[CFX^1—CX^2X^3]—$$ formula (a1)

wherein, in formula (a1), each of $X^1$ and $X^2$ independently represents a hydrogen atom, a chlorine atom, or a fluorine atom, $X^3$ represents a chlorine atom, a fluorine atom, or $—CY^1Y^2Y^3$, and each of $Y^1$, $Y^2$, and $Y^3$ independently represents a hydrogen atom, a chlorine atom, or a fluorine atom.

4. The film according to claim 1,
wherein the fluorine-containing polymer includes a structural unit represented by formula (a1) below and a structural unit derived from vinyl ether, and $$—[CFX^1—CX^2X^3]—$$ formula (a1)

wherein, in formula (a1), each of $X^1$ and $X^2$ independently represents a hydrogen atom, a chlorine atom, or a fluorine atom, $X^3$ represents a chlorine atom, a fluorine atom, or $—CY^1Y^2Y^3$, and each of $Y^1$, $Y^2$, and $Y^3$ independently represents a hydrogen atom, a chlorine atom, or a fluorine atom.

5. The film according to claim 4,
wherein the fluorine-containing polymer includes 40 mol % to 90 mol % of a structural unit represented by formula (a1) above, 3 mol % to 50 mol % of a structural unit represented by formula (a2) below, 0.5 mol % to 30 mol % of a structural unit represented by formula (a3) below, and 0.2 mol % to 7 mol % of a structural unit represented by formula (a4) below,
wherein values of total mol % of the respective structural units represented by formulae (a1), (a2), (a3), and (a4) are 80 to 100, and at least a portion of $R^4$ in the structural unit represented by formula (a4) below is $—NZ^1Z^2Z^3$,

formula (a2)

wherein, in formula (a2), $R^a$ represents a hydrogen atom or a methyl group, $R^1$ represents an alkyl group having 1 to 12 carbon atoms or a monovalent alicyclic group having 4 to 10 carbon atoms, j represents an integer of 0 to 8, and k represents 0 or 1,

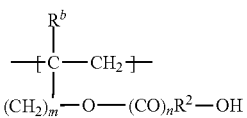

formula (a3)

wherein, in formula (a3), $R^b$ represents a hydrogen atom or a methyl group, $R^2$ represents an alkylene group having 1 to 10 carbon atoms or a divalent alicyclic group having 4 to 10 carbon atoms, m represents an integer of 0 to 8, and n represents 0 or 1, and

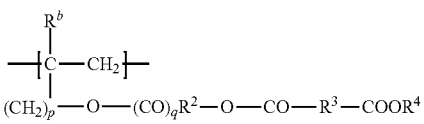

formula (a4)

wherein, in formula (a4), $R^b$ represents a hydrogen atom or a methyl group, $R^2$ represents an alkylene group having 1 to 10 carbon atoms or a divalent alicyclic group having 4 to 10 carbon atoms, $R^3$ represents an alkylene group having 2 to 10 carbon atoms or a divalent alicyclic group having 4 to 10 carbon atoms, $R^4$ represents a hydrogen atom or $-NZ^1Z^2Z^3$, each of $Z^1$, $Z^2$, and $Z^3$ independently represents a hydrogen atom, an alkyl group having 1 to 4 carbon atoms, or a hydroxyalkyl group having 1 to 6 carbon atoms, p represents an integer of 0 to 8, and q represents 0 or 1.

6. The film according to claim 1, wherein the easily adhesive layer is formed from an aqueous emulsion including the fluorine-containing polymer.

7. The film according to claim 6, wherein the minimum film formation temperature of the aqueous emulsion is 30° C. or lower.

8. The film according to claim 1, wherein a layer A having a water contact angle of 70° or less is laminated adjacent to the easily adhesive layer on a surface on an opposite side to a surface in contact with the substrate, among both surfaces of the easily adhesive layer.

9. The film according to claim 8, wherein the layer A includes a gelatin.

10. The film according to claim 8, wherein a photosensitive material layer for forming a transparent conductive layer is further laminated on a surface on an opposite side to a surface in contact with the easily adhesive layer, among both surfaces of the layer A.

11. A transparent conductive film comprising:
a transparent conductive layer formed by exposing and developing the photosensitive material layer for forming the transparent conductive layer of the film according to claim 10.

12. A touch panel comprising:
the transparent conductive film according to claim 11.

13. A transparent conductive film comprising:
the film according to claim 1; and
a transparent conductive layer.

14. A touch panel comprising:
the transparent conductive film according to claim 13.

15. A method for producing a film, comprising:
laminating an easily adhesive layer by directly applying a coating liquid for forming an easily adhesive layer on a substrate including a cyclic olefin-based resin,
wherein the content of a fluorine-containing polymer in the coating liquid for forming the easily adhesive layer is greater than 20 mass % with respect to the total mass of the coating liquid for forming the easily adhesive layer, and
the water content of the easily adhesive layer is 0.3% to 2.5%.

16. The method for producing a film according to claim 15, further comprising:
laminating a layer A by directly applying a coating liquid for forming the layer A on the easily adhesive layer,
wherein the water contact angle of the layer A is 70° or less.

17. The method for producing a film according to claim 16,
wherein the coating liquid for forming the layer A includes a gelatin.

18. The method for producing a film according to claim 16, further comprising:
laminating a photosensitive material layer for forming a transparent conductive layer by directly applying an emulsion of the photosensitive material for forming the transparent conductive layer on the layer A.

19. A film comprising:
a substrate including a cyclic olefin-based resin; and
an easily adhesive layer that is laminated adjacent to the substrate,
wherein the content of a fluorine-containing polymer in the easily adhesive layer is greater than 20 mass % with respect to the total mass of the easily adhesive layer, and
wherein a layer A having a water contact angle of 70° or less is laminated adjacent to the easily adhesive layer on a surface on an opposite side to a surface in contact with the substrate, among both surfaces of the easily adhesive layer.

* * * * *